(12) United States Patent
Vance et al.

(10) Patent No.: US 8,631,070 B2
(45) Date of Patent: *Jan. 14, 2014

(54) PROVIDING EVENT DATA TO A GROUP OF CONTACTS

(75) Inventors: Michael Steffen Vance, Kenmore, WA (US); Jeffrey Allen Armantrout, Woodinville, WA (US); Jessi E. Alva, Bellevue, WA (US); Teresa S. Valdez Klein, Mercer Island, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 821 days.

This patent is subject to a terminal disclaimer.

(21) Appl. No.: 12/413,487

(22) Filed: Mar. 27, 2009

(65) Prior Publication Data

US 2010/0250672 A1    Sep. 30, 2010

(51) Int. Cl.
*G06F 15/16* (2006.01)

(52) U.S. Cl.
USPC ............ 709/204; 709/205; 709/206; 709/207

(58) Field of Classification Search
USPC .................................................. 709/204–207
See application file for complete search history.

(56) References Cited

U.S. PATENT DOCUMENTS

| | | | |
|---|---|---|---|
| 4,723,209 A | 2/1988 | Hernandez et al. |
| D296,218 S | 6/1988 | Wells-Papanek et al. |
| D298,144 S | 10/1988 | Wells-Papanek et al. |
| D384,052 S | 9/1997 | Kodosky |
| D388,424 S | 12/1997 | DeMuro et al. |
| D391,948 S | 3/1998 | Eisenberg |
| 5,724,531 A | 3/1998 | Miyashita et al. |
| 5,751,980 A | 5/1998 | Musashi et al. |
| D395,427 S | 6/1998 | Arora et al. |
| 5,793,365 A | 8/1998 | Tang et al. |
| D397,687 S | 9/1998 | Arora et al. |
| D398,595 S | 9/1998 | Baer et al. |
| 5,867,226 A | 2/1999 | Wehmeyer et al. |

(Continued)

FOREIGN PATENT DOCUMENTS

| | | |
|---|---|---|
| DE | 10155431 A1 | 6/2003 |
| EP | 1246434 A1 | 10/2002 |

(Continued)

OTHER PUBLICATIONS

Alltel Launches 'My Circle,' a One-of-a-Kind Program That Gives Customers Free Calls to Any Network or Number They Choose, Business Wire, Apr. 20, 2006, pp. 1, New York.

(Continued)

*Primary Examiner* — Minh-Chau Nguyen
(74) *Attorney, Agent, or Firm* — Knobbe, Martens, Olson & Bear LLP

(57) ABSTRACT

Data related to an event is provided to a group of contacts while the event is occurring via an event user interface that enables the group of contacts to coordinate with one another during the event. In this regard, an event coordination service is provides the event data to each contact of the group for review via an event user interface that is persistently displayed on a telecommunication or other computing device associated with the contact for the contact's easy and immediate reference during the event. When the event ultimately concludes, display of the event user interface ceases as the group of contacts likely no longer needs immediate or ready reference to the event.

37 Claims, 14 Drawing Sheets

(56) References Cited

U.S. PATENT DOCUMENTS

| | | |
|---|---|---|
| 5,889,517 A | 3/1999 | Ueda et al. |
| 5,987,107 A | 11/1999 | Brown |
| 6,006,200 A | 12/1999 | Boies et al. |
| 6,016,478 A * | 1/2000 | Zhang et al. ............... 705/7.19 |
| 6,023,275 A | 2/2000 | Horvitz et al. |
| D424,036 S | 5/2000 | Arora et al. |
| D424,541 S | 5/2000 | Mugura |
| 6,108,533 A | 8/2000 | Brohoff |
| 6,130,726 A | 10/2000 | Darbee et al. |
| 6,144,863 A | 11/2000 | Charron |
| 6,151,059 A | 11/2000 | Schein et al. |
| D437,858 S | 2/2001 | Yasui et al. |
| 6,188,406 B1 | 2/2001 | Fong et al. |
| D438,873 S | 3/2001 | Wang et al. |
| 6,201,957 B1 | 3/2001 | Son et al. |
| D440,979 S | 4/2001 | Wang et al. |
| 6,236,398 B1 | 5/2001 | Kojima et al. |
| D445,426 S | 7/2001 | Wang et al. |
| D446,790 S | 8/2001 | Wang et al. |
| 6,313,877 B1 | 11/2001 | Anderson |
| D454,139 S | 3/2002 | Feldcamp |
| 6,359,635 B1 | 3/2002 | Perttunen |
| 6,393,430 B1 | 5/2002 | Van Ryzin |
| D459,361 S | 6/2002 | Inagaki |
| D463,444 S | 9/2002 | Istvan et al. |
| 6,460,181 B1 | 10/2002 | Donnelly |
| 6,486,870 B1 | 11/2002 | Kozu |
| D470,857 S | 2/2003 | Anderson et al. |
| D471,226 S | 3/2003 | Gray |
| D472,902 S | 4/2003 | Nashida et al. |
| D474,778 S | 5/2003 | Barnes |
| D475,064 S | 5/2003 | Nashida et al. |
| 6,563,515 B1 | 5/2003 | Reynolds et al. |
| 6,577,330 B1 | 6/2003 | Tsuda et al. |
| D478,912 S | 8/2003 | Johnson |
| D485,279 S | 1/2004 | DeCombe |
| 6,678,891 B1 | 1/2004 | Wilcox et al. |
| D486,499 S | 2/2004 | Hayashi et al. |
| 6,716,101 B1 * | 4/2004 | Meadows et al. .......... 455/456.1 |
| 6,741,268 B1 | 5/2004 | Hayakawa |
| D495,339 S | 8/2004 | Gildred |
| 6,775,659 B2 | 8/2004 | Clifton-Bligh |
| D495,715 S | 9/2004 | Gildred |
| 6,788,987 B2 | 9/2004 | Slechta et al. |
| 6,850,255 B2 | 2/2005 | Muschetto |
| 6,865,404 B1 | 3/2005 | Tikkala et al. |
| D506,474 S | 6/2005 | Gildred |
| 6,907,575 B2 | 6/2005 | Duarte |
| D507,577 S | 7/2005 | Totten et al. |
| 6,920,328 B2 | 7/2005 | Wollrab |
| 6,925,650 B1 | 8/2005 | Arsenault et al. |
| 6,959,207 B2 | 10/2005 | Keinonen et al. |
| 6,978,473 B1 | 12/2005 | Nsonwu et al. |
| D523,439 S | 6/2006 | Kuroda |
| D523,440 S | 6/2006 | Hernandez et al. |
| D523,868 S | 6/2006 | Kuroda |
| 7,086,008 B2 | 8/2006 | Capps et al. |
| 7,089,287 B2 | 8/2006 | Bellotti et al. |
| 7,111,788 B2 | 9/2006 | Reponen |
| 7,117,445 B2 | 10/2006 | Berger |
| 7,137,073 B2 | 11/2006 | Kim et al. |
| 7,178,109 B2 | 2/2007 | Hewson et al. |
| 7,187,761 B2 | 3/2007 | Bookstaff |
| D543,992 S | 6/2007 | Vigesaa |
| D544,875 S | 6/2007 | Wang et al. |
| D544,877 S | 6/2007 | Sasser |
| D545,324 S | 6/2007 | Decombe |
| 7,236,780 B2 | 6/2007 | Benco et al. |
| D545,827 S | 7/2007 | Evans et al. |
| D545,832 S | 7/2007 | Armendariz |
| D547,321 S | 7/2007 | Viegers et al. |
| 7,248,677 B2 | 7/2007 | Randall et al. |
| 7,248,857 B1 | 7/2007 | Richardson et al. |
| D548,743 S | 8/2007 | Takahashi et al. |
| D550,681 S | 9/2007 | Totten et al. |
| D554,142 S | 10/2007 | Cameron |
| 7,280,652 B2 | 10/2007 | Bocking et al. |
| D554,652 S | 11/2007 | Shen et al. |
| D556,765 S | 12/2007 | Evans et al. |
| D558,221 S | 12/2007 | Nagata et al. |
| D562,343 S | 2/2008 | Fletcher |
| 7,330,845 B2 | 2/2008 | Lee et al. |
| D563,972 S | 3/2008 | Sherry |
| 7,343,565 B2 | 3/2008 | Ying et al. |
| D565,586 S | 4/2008 | Shin et al. |
| D567,817 S | 4/2008 | Kwag et al. |
| D568,334 S | 5/2008 | Okaro et al. |
| D568,897 S | 5/2008 | Byeon |
| D568,898 S | 5/2008 | Byeon |
| D568,899 S | 5/2008 | Byeon |
| D569,387 S | 5/2008 | Byeon |
| 7,369,850 B2 | 5/2008 | Andrew et al. |
| D570,369 S | 6/2008 | Fletcher |
| D571,819 S | 6/2008 | Scott et al. |
| D573,601 S | 7/2008 | Gregov et al. |
| D574,392 S | 8/2008 | Kwag et al. |
| D575,297 S | 8/2008 | Glezer et al. |
| D575,792 S | 8/2008 | Benson |
| D576,174 S | 9/2008 | Ording et al. |
| D577,364 S | 9/2008 | Flynt et al. |
| D578,134 S | 10/2008 | Jasinski |
| D578,543 S | 10/2008 | Ulm et al. |
| 7,437,005 B2 | 10/2008 | Drucker et al. |
| D580,450 S | 11/2008 | Chen et al. |
| D580,946 S | 11/2008 | Chen et al. |
| 7,450,927 B1 | 11/2008 | Creswell et al. |
| D582,426 S | 12/2008 | Chen et al. |
| D582,928 S | 12/2008 | Blankenship et al. |
| D585,453 S | 1/2009 | Chen et al. |
| D585,454 S | 1/2009 | Ismail |
| D586,361 S | 2/2009 | Horowitz et al. |
| D586,362 S | 2/2009 | Horowitz et al. |
| 7,490,295 B2 | 2/2009 | Chaudhri et al. |
| D588,148 S | 3/2009 | Stone et al. |
| D588,149 S | 3/2009 | Brownell et al. |
| D590,407 S | 4/2009 | Watanabe et al. |
| 7,526,306 B2 | 4/2009 | Brems et al. |
| D592,218 S | 5/2009 | Blankenship et al. |
| D592,674 S | 5/2009 | Kwag |
| D593,120 S | 5/2009 | Bouchard et al. |
| D593,574 S | 6/2009 | Guimaraes et al. |
| D593,576 S | 6/2009 | Ball et al. |
| D594,015 S | 6/2009 | Singh et al. |
| 7,546,543 B2 | 6/2009 | Louch et al. |
| 7,555,727 B2 | 6/2009 | Hawkins et al. |
| D596,192 S | 7/2009 | Shotel |
| 7,577,700 B2 | 8/2009 | Tolson et al. |
| D599,368 S | 9/2009 | Kanga et al. |
| D599,806 S | 9/2009 | Brown et al. |
| D599,807 S | 9/2009 | Marashi |
| D599,810 S | 9/2009 | Scalisi et al. |
| D599,812 S | 9/2009 | Hirsch |
| D599,813 S | 9/2009 | Hirsch |
| D599,814 S | 9/2009 | Ogura et al. |
| 7,587,683 B2 | 9/2009 | Ito et al. |
| D602,038 S | 10/2009 | Channell et al. |
| 7,603,628 B2 | 10/2009 | Park et al. |
| D603,415 S | 11/2009 | Lin et al. |
| D603,416 S | 11/2009 | Poling et al. |
| D603,418 S | 11/2009 | Magnani et al. |
| D603,420 S | 11/2009 | Channell |
| D603,867 S | 11/2009 | La et al. |
| D604,310 S | 11/2009 | Ahn |
| D604,317 S | 11/2009 | Hoefnagels et al. |
| D604,740 S | 11/2009 | Matheny et al. |
| 7,620,996 B2 | 11/2009 | Torres et al. |
| D605,200 S | 12/2009 | Sakai |
| D605,652 S | 12/2009 | Plaisted et al. |
| D605,653 S | 12/2009 | Danton |
| D606,088 S | 12/2009 | Yokouchi et al. |
| D606,550 S | 12/2009 | La et al. |
| 7,636,889 B2 | 12/2009 | Weber et al. |
| D608,366 S | 1/2010 | Matas |
| 7,646,745 B2 | 1/2010 | Caldwell et al. |

(56) References Cited

U.S. PATENT DOCUMENTS

| | | |
|---|---|---|
| 7,650,361 B1 | 1/2010 | Wong et al. |
| D609,714 S | 2/2010 | Oda et al. |
| D609,715 S | 2/2010 | Chaudhri |
| D610,159 S | 2/2010 | Matheny et al. |
| D610,161 S | 2/2010 | Matas |
| 7,665,028 B2 | 2/2010 | Cummins et al. |
| D611,056 S | 3/2010 | Langlois et al. |
| D611,484 S | 3/2010 | Mays et al. |
| D611,485 S | 3/2010 | Marashi |
| D611,490 S | 3/2010 | Lee et al. |
| D612,394 S | 3/2010 | La et al. |
| D612,860 S | 3/2010 | Tarara et al. |
| 7,673,017 B2 | 3/2010 | Kim et al. |
| 7,685,520 B2 | 3/2010 | Rashkovskiy et al. |
| 7,685,530 B2 | 3/2010 | Sherrard et al. |
| D613,300 S | 4/2010 | Chaudhri |
| D614,191 S | 4/2010 | Takano et al. |
| D614,192 S | 4/2010 | Takano et al. |
| D614,646 S | 4/2010 | Chen et al. |
| D615,090 S | 5/2010 | Sogabe |
| D615,546 S | 5/2010 | Lundy et al. |
| D615,549 S | 5/2010 | Caine et al. |
| 7,720,498 B2 | 5/2010 | Lee |
| D619,593 S | 7/2010 | Fujioka et al. |
| 7,752,552 B2 * | 7/2010 | Pennington et al. ......... 715/751 |
| D620,948 S | 8/2010 | Scalisi et al. |
| 7,853,881 B1 | 12/2010 | Assal et al. |
| 7,886,000 B1 * | 2/2011 | Polis et al. .................. 709/203 |
| 2002/0045960 A1 | 4/2002 | Phillips et al. |
| 2002/0052754 A1 | 5/2002 | Joyce et al. |
| 2002/0145623 A1 | 10/2002 | DeCombe |
| 2003/0126250 A1 * | 7/2003 | Jhanji ......................... 709/223 |
| 2003/0225879 A1 | 12/2003 | Chipchase |
| 2004/0046796 A1 | 3/2004 | Fujita |
| 2004/0058698 A1 * | 3/2004 | Crockett et al. .............. 455/518 |
| 2004/0067751 A1 | 4/2004 | Vandermeijden |
| 2004/0077340 A1 | 4/2004 | Forsyth |
| 2004/0091093 A1 | 5/2004 | Bookstaff |
| 2004/0100479 A1 | 5/2004 | Nakano et al. |
| 2004/0102225 A1 | 5/2004 | Furuta et al. |
| 2004/0122684 A1 | 6/2004 | Kaikuranta |
| 2004/0162812 A1 | 8/2004 | Lane |
| 2004/0162830 A1 * | 8/2004 | Shirwadkar et al. ............ 707/10 |
| 2004/0221239 A1 | 11/2004 | Hachigian et al. |
| 2004/0235520 A1 | 11/2004 | Cadiz et al. |
| 2004/0239982 A1 | 12/2004 | Gignac |
| 2004/0250217 A1 | 12/2004 | Tojo et al. |
| 2005/0005235 A1 | 1/2005 | Satterfield et al. |
| 2005/0010876 A1 | 1/2005 | Robertson et al. |
| 2005/0020243 A1 | 1/2005 | Benco et al. |
| 2005/0039140 A1 | 2/2005 | Chen |
| 2005/0041011 A1 | 2/2005 | Silfverberg et al. |
| 2005/0071780 A1 | 3/2005 | Muller et al. |
| 2005/0079863 A1 | 4/2005 | Macaluso |
| 2005/0091272 A1 | 4/2005 | Smith et al. |
| 2005/0094205 A1 | 5/2005 | Lo et al. |
| 2005/0114374 A1 | 5/2005 | Juszkiewicz et al. |
| 2005/0118996 A1 | 6/2005 | Lee et al. |
| 2005/0143135 A1 | 6/2005 | Brems et al. |
| 2005/0143138 A1 | 6/2005 | Lee et al. |
| 2005/0172001 A1 | 8/2005 | Zaner et al. |
| 2005/0209994 A1 | 9/2005 | Noro et al. |
| 2005/0229110 A1 | 10/2005 | Gegner et al. |
| 2005/0235225 A1 | 10/2005 | Pradhan et al. |
| 2005/0235226 A1 | 10/2005 | Watanabe et al. |
| 2005/0235251 A1 | 10/2005 | Arend et al. |
| 2005/0243979 A1 | 11/2005 | Starbuck et al. |
| 2005/0245236 A1 | 11/2005 | Servi et al. |
| 2005/0246654 A1 | 11/2005 | Hally et al. |
| 2005/0278652 A1 | 12/2005 | Scholz |
| 2006/0055700 A1 | 3/2006 | Niles et al. |
| 2006/0084410 A1 | 4/2006 | Sutaria et al. |
| 2006/0123360 A1 | 6/2006 | Anwar et al. |
| 2006/0143574 A1 | 6/2006 | Ito et al. |
| 2006/0212829 A1 | 9/2006 | Yahiro et al. |
| 2006/0216021 A1 | 9/2006 | Touchard et al. |
| 2006/0242597 A1 | 10/2006 | Park |
| 2006/0293057 A1 | 12/2006 | Mazerski et al. |
| 2007/0011617 A1 | 1/2007 | Akagawa et al. |
| 2007/0033540 A1 | 2/2007 | Bridges et al. |
| 2007/0038503 A1 | 2/2007 | Krajcev et al. |
| 2007/0067738 A1 | 3/2007 | Flynt et al. |
| 2007/0073874 A1 | 3/2007 | Moghaddam et al. |
| 2007/0117572 A1 | 5/2007 | Adam et al. |
| 2007/0130221 A1 | 6/2007 | Abdo et al. |
| 2007/0162862 A1 * | 7/2007 | Ogasawara et al. ........... 715/751 |
| 2007/0174389 A1 | 7/2007 | Armstrong et al. |
| 2007/0198947 A1 | 8/2007 | Cox et al. |
| 2007/0218891 A1 * | 9/2007 | Cox ......................... 455/422.1 |
| 2007/0226645 A1 | 9/2007 | Kongqiao et al. |
| 2007/0233736 A1 | 10/2007 | Xiong et al. |
| 2007/0255807 A1 * | 11/2007 | Hayashi et al. ............... 709/219 |
| 2007/0268908 A1 | 11/2007 | Linkola et al. |
| 2008/0059570 A1 | 3/2008 | Bill |
| 2008/0086703 A1 | 4/2008 | Flynt et al. |
| 2008/0122870 A1 | 5/2008 | Brodersen et al. |
| 2008/0235248 A1 | 9/2008 | Krantz et al. |
| 2008/0307661 A1 | 12/2008 | Hembree |
| 2008/0319943 A1 * | 12/2008 | Fischer ........................... 707/3 |
| 2009/0040875 A1 | 2/2009 | Buzescu et al. |
| 2009/0106376 A1 | 4/2009 | Tom et al. |
| 2009/0164923 A1 | 6/2009 | Ovi |
| 2009/0327437 A1 * | 12/2009 | Estrada ........................ 709/206 |
| 2010/0057858 A1 * | 3/2010 | Shen et al. ................... 709/206 |
| 2010/0246789 A1 * | 9/2010 | Vance et al. ............. 379/201.01 |
| 2010/0250672 A1 | 9/2010 | Vance et al. |
| 2010/0293105 A1 * | 11/2010 | Blinn et al. .................. 705/319 |
| 2011/0047182 A1 * | 2/2011 | Shepherd et al. ............. 707/780 |

FOREIGN PATENT DOCUMENTS

| | | |
|---|---|---|
| EP | 1571808 A1 | 9/2005 |
| JP | H11-088496 | 3/1999 |
| JP | H11-327741 | 11/1999 |
| JP | 2000-348058 A | 12/2000 |
| JP | 2003-198705 A | 7/2003 |
| JP | 2004-208217 A | 7/2004 |
| JP | 2004-348601 A | 12/2004 |
| JP | 2005-072958 A | 3/2005 |
| JP | 2006-107473 | 4/2006 |
| JP | 2007-524892 | 8/2007 |
| KR | 10-2006-0031624 | 4/2006 |
| WO | WO 00/25501 A1 | 5/2000 |
| WO | WO 2005/045799 A1 | 5/2005 |
| WO | WO 2005/064441 A1 | 7/2005 |
| WO | WO 2006/016227 A2 | 2/2006 |
| WO | WO 2007/127642 | 11/2007 |

OTHER PUBLICATIONS

Alltel's 'My Circle' Plan Lets Subscribers Adds 10 Numbers for Unlimited Calls, Wireless News, Apr. 23, 2006, pp. 2, Coventry.

AT&T, LG Xenon User Guide, Apr. 8, 2009, 146 pages.

Boy Genius, LG Xenon hitting AT&T Before Christmas?, http://www.boygeniusreport.com/2008/09/24/lg-xenon-hitting-att-before-christmas/, 9/24/08, 1 page.

Cuneo, Alice Z., Alltel Gets Aggressive in Telecom War, Advertising Age, Apr. 24, 2006, vol. 77, Issue 17, pp. 8, 1 pg., Chicago (Midwest region edition).

Weisser, Cybele and Farnoosh Torabi. "What do you pay to stay connected?" Money Magazine, Nov. 24, 2003. http://money.cnn.com/2003/11/20/pf/portability_strategy_0312/index.htm.

* cited by examiner

USER A'S
TELECOMMUNICATIONS DEVICE  HELLO ▼  ─500

◄ | WELCOME | EVENT COORDINATION SERVICE | OTHER | ► ▲

REQUEST COORDINATI[ON]

| GROUP ─534
| ☑ FAMILY ─536
| ☐ SOCCER TEAM ─538
| ☐ CO-WORKERS ─540
| ▼

EVENT DESCRIPTION: DAY AT T[HE]

START DATE: MARCH 9, 2009  END DATE:

START TIME: 12:15PM ▼  END TIME: 5:15PM ▼  ☐ EVENT

🔔 CHECK IN REMINDER  1 HOUR ▼

LOCATION NAME: NORTH BEACH

STREET: 123 OCEAN DRIVE  CITY: ANYWHERE

STATE: CA ▼  ZIP: 12345  OR

IDENTIFY MY CURRENT
☑ LOCATION

556 ─► INCLUDE GROUP CONTACTS WITHIN: 5 MILES ▼

INCLUDE POINTS OF INTEREST WITHIN: ▼

MESSAGE: WE'RE GOING SURFING AT NORTH BEACH. LET'S MEET UP.

↩  (SUBMIT)  ↪

*Fig. 5B.*

USER A'S
TELECOMMUNICATIONS DEVICE  HELLO ▼  ─ 500

◀ | WELCOME | EVENT COORDINATION SERVICE | OTHER | ▶ ▲

REQUEST COORDINATIO | POINTS OF INTEREST

EVENT DESCRIPTION: DAY AT T[ ]

☑ ENTERTAINMENT ← 542
☐ HOTELS ← 544
☐ GAS STATIONS ← 546
☑ RESTAURANTS ← 548
☑ SHOPPING ← 550
☐ MUNICIPAL ← 552
▼ ← 554

START DATE: MARCH 9, 2009   END DATE:

START TIME: 12:15PM ▼   END TIME: 5:15PM

🔔 CHECK IN REMINDER 1 HOU[ ]

LOCATION NAME: NORTH BEACH

STREET: 123 OCEAN DRIVE   CITY: ANYWHERE

STATE: CA ▼   ZIP: 12345   OR

IDENTIFY MY CURRENT
☑ LOCATION

INCLUDE GROUP CONTACTS WITHIN: 5 MILES ▼

558 ─▶ INCLUDE POINTS OF INTEREST WITHIN: 1 MILE ▼

MESSAGE: WE'RE GOING SURFING AT NORTH BEACH. LET'S MEET UP.

↩   ( SUBMIT )   ↪

*Fig.5C.*

PROVIDING EVENT DATA TO A GROUP OF CONTACTS

BACKGROUND

Generally described, telecommunications devices and communication networks facilitate the collection and exchange of information. Utilizing a communication network and relevant communication protocols, a telecommunications device can engage in audio and/or data communications (such as voice calls, video calls, text messages (e.g., SMS), multimedia messages (e.g., MMS), content streaming, instant messaging, Web surfing, and the like) with telecommunications devices.

To facilitate communications, telecommunications devices can be associated with software and hardware components that allow the telecommunications device to maintain contact information, such as telephone numbers, email addresses, messaging addresses, etc., maintain personal information, such as task lists, calendars, etc. and send messages utilizing the contact information via available communication channels.

Given the prevalence of telecommunications devices in an increasingly mobile society, many users utilize their telecommunications devices to organize events and communicate with each other during the event, e.g., through voice calls, instant messaging, etc. Although users can communicate with each other during an event in this manner, it may still be difficult for users to coordinate activities, interests, meeting times/locations, etc. during the event, especially if the event is of any appreciable duration, the event is spread out over a geographic area, and/or there is a critical mass of users participating in the event. For example, a family visiting an amusement park may decide to separate and visit different attractions or other points of interest. While they may call each other on their respective mobile phones to coordinate, for example, where to meet again or give a recommendation for an attraction, such coordination typically requires multiple and perhaps time consuming calls and/or messages, forwarding of messages to others family members at the park, etc. This may institute delays, result in miscommunication, etc. Moreover, such haphazard event coordination does not lend itself to social network environments in which users are accustomed to communicating and interacting in real-time on a group or community basis.

BRIEF DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein:

FIGS. 5A-C are illustrative user interfaces generated on a telecommunications or other computing device for enabling a user to request event coordination among a group of contacts;

DETAILED DESCRIPTION

Figure 1:
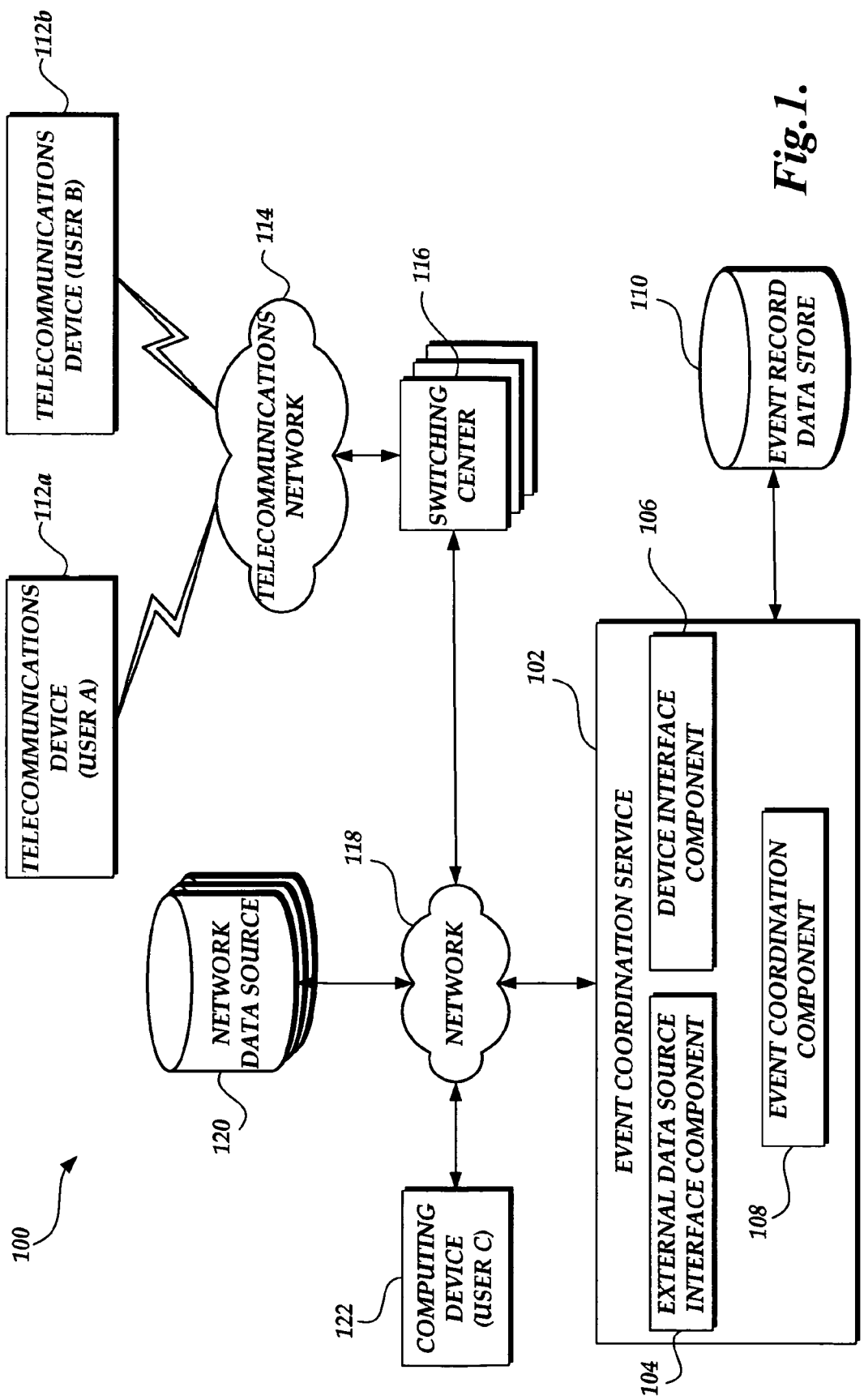
FIG. 1 is a block diagram illustrating a telecommunications environment in which a group of contacts utilize telecommunications and other computing devices to provide one another with event data during the occurrence an event.

Generally described, aspects of the present disclosure relate to providing data related to an event to a group of contacts while the event is occurring via an event user interface that enables the group of contacts to coordinate with one another during the event. In this regard, an event coordination service is described in one embodiment that receives a request from a user of a telecommunication device (e.g., a mobile telephone) or other computing to coordinate an event for a group of contacts. In one embodiment, the event user interface generated by the event coordination service is persistently displayed on the telecommunication or other computing device associated with each contact for the contact's easy and immediate reference during the event. The event user interface may include, but not be limited to, a map indicating points of interest for the event and/or indicating the locations of the contacts in the group, recommendations and other information for points of interest for the event, controls for initiating communication with other contacts of the group, etc. In one embodiment, such a persistently displayed user interface takes the form of a "top-of-the-device" or "top-level" user interface or display, as it (a portion thereof, or a minimized representation thereof) is displayed on top or within a home page or idle screen of the device, as the front or start screen (below or behind which other user interfaces appear or are cascaded), in an area of prominence on such a home, idle, front or start screen, etc. The event user interface is thus substantially continuously displayed on the device until some other action is taken by the contact, e.g., the contact navigates to another user interface, the contact initiates a voice call, etc. However, upon completion of the action, the event user interface reappears on "top-of-the device" for ready reference by the contact.

During the course of the event, the group of contacts may find the need to coordinate activities, interests, meeting times/locations, and the like during the event, especially if the event is of any appreciable duration, the event is spread out over a geographic area, and/or there is a critical mass of contacts participating in the event. For example, a group of contacts, such as a family, visiting an amusement park may decide to separate and visit different attractions or other points of interest. Accordingly, a contact of the group may refer to the "top-of-the-device" event user interface generated on her mobile phone to immediately discern where the remaining contacts of the group are located, e.g., from a map included in the event user interface. The contact can initiate a communication (e.g., an electronic message, voice call etc.) with the other contacts of the group suggesting that the group meet at a point of interest on the map that is in close proximity to the group, is highly recommended, is of particular interest, etc. The contact can also request and/or provide additional data related to the event that may be of interest, for example, restaurant reviews, attraction prices, location information, images, videos, etc. In this manner, a group of contacts can collaboratively coordinate the event and share event data in real-time or near real-time while the event is occurring. Since such event data is presented to the group of contacts in a "top-of-the-device" event user interface, contacts have easy and immediate access to the data, and thus can be regularly informed of event updates during the event. When the event ultimately concludes, display of the event user interface ceases (at least at the "top-of-the-device") in some embodiments, as the group of contacts likely no longer needs immediate or ready reference to the event data.

Although aspects of the present disclosure will be described with regard to an illustrative telecommunications environment and component interactions, telecommunications protocols, flow diagrams and user interfaces, one skilled in the relevant art will appreciate that the disclosed embodiments are illustrative in nature and should not be construed as limiting. Specifically, although the term telecommunications device is used in this document, the term represents any type of device having a component for communicating with one or more other devices via one or more communication paths. Such communication paths can include wireless communication paths (via infra-red, RF, optical, terrestrial, or satellite communication media) and wired communication paths.

With reference now to FIG. 1, a block diagram illustrative of a telecommunications environment 100 will be described in which a user of a telecommunications or other device may provide data related to an event to a group of contacts while the event is occurring and in which the group of contacts is enable to coordinate with one another during the event. A contact may correspond to an individual person, an identifier associated with a person (such as a telephone number), a group of people, an identifier associated with a group of people, and the like. The telecommunications environment 100 can include an event coordination service 102. As described above, the event coordination service 102 may receive a request to coordinate an event from a contact of a group utilizing a telecommunications or other computing device and then provide data related to the event to each contact of the group for the contact's easy and immediate reference during the event. In one embodiment, event records including data related to each event (e.g., an event descriptor, a start date/time, and end date/time, a location, etc.) for which an event user interface is to be generated are stored in an event record data store 110 accessible by the event coordination service 102. An event record may include any data related to the event obtained from the originating contact or any other contacts of the group participating in the event, as well as any location or other supplemental data obtained by the event coordination service 102 from other sources, such as network data sources 120. Such network data sources may include web sites, recommendations services, content providing services, location based services, social network services, telecommunications services, message publication services, etc. While the event record data store 110 is depicted in FIG. 1 as being local to the event coordination service 102, those skilled in the art will appreciate that the event record data store 110 may be remote to the event coordination service 102 and/or may be a network based service itself.

While the event coordination service 102 is depicted in FIG. 1 as implemented by a single computing device in the telecommunications environment 100, this is illustrative only. The event coordination service 102 may be embodied in a plurality of computing devices, each executing an instance of the event coordination service. A server or other computing device implementing the event coordination service 102 may include memory, processing unit(s), and computer readable medium drive(s), all of which may communicate with one another by way of a communication bus. A network interface may provide connectivity over the network 118 and/or other networks or computer systems. The processing unit(s) may communicate to and from memory containing program instructions that the processing unit(s) executes in order to operate the event coordination service 102. The memory generally includes RAM, ROM, and/or other persistent and auxiliary memory.

As illustrated in FIG. 1, the event coordination service 102 can include an external data source interface component 104 for obtaining external information from network data sources 120, such as location data for the event or the contacts of the group, and other supplemental data for the event (e.g., an image of the event location; a map to the event location; reviews for the event or event location; recommendations for related events, services, products, activities, and other locations; etc.). The event coordination service 102 can also include a device interface component 106 for obtaining device information from the telecommunications or other computing devices associated with the contacts of the group (e.g., location data for a contact's telecommunications device, an IP address for a contact's home computing device, etc.). The event coordination service 102 can further include an event coordination component 108 for processing the obtained data, as well as the requests for event coordination and event updates so as to facilitate coordination of an event by the group of contacts.

One skilled in the relevant art will appreciate that the event coordination service 102 may correspond to a number of computer devices, such as server computing devices. Additionally, the external data source interface component 104, device interface component 106, and event coordination component 108 may be implemented in a single computing device or across multiple computing devices. One skilled in the relevant art will also appreciate that the event coordination service 102 may include any one of a number of additional hardware and software components that would be utilized in the illustrative computerized network environment to carry out the illustrative functions of the service 102 and/or any of the individually identified components.

With continued reference to FIG. 1, the telecommunications environment 100 can include a number of telecommunications devices 112a, 112b or other computing devices 122, each associated with a contact. As will be described in more detail below, a contact of a group may request event coordination from the event coordination service 102 or submit an event contribution to the event coordination service 102 using a telecommunications device 112a, 112b or other computing device 122. In an illustrative embodiment, the computing device 122 can include various hardware and/or software components, such as a browser software application or another software application, for requesting or receiving event notifications. The telecommunications devices 112a, 112b and other computing devices 122 can correspond to a wide variety of devices or components that are capable of initiating, receiving or facilitating communications over a communication network including, but not limited to, personal computing devices, electronic book readers (e.g., e-book readers), hand held computing devices, integrated components for inclusion in computing devices, home electronics, appliances, vehicles, machinery, landline telephones, VoIP telephones, cordless telephones, cellular telephones, smart phones, modems, personal digital assistants, laptop computers, gaming devices, media players, and the like. In an illustrative embodiment, the telecommunications devices 112a, 112b include a wide variety of software and hardware components for establishing communications over one or more communication networks, including cellular telecommunications network 114, a wired telecommunications network (not shown) and/or an IP-based telecommunications network (not shown). Illustrative components of a telecommunications device 112a, 112b will be described in greater detail with regard to FIG. 2. Although the present disclosure references a telecommunications device 112a, 112b, one skilled in the relevant art will appreciate that a telecommunications device may correspond to, or otherwise be referred to, as a mobile communication device, a wireless computing device, or a computing device. Accordingly, reference to a telecommunications device 112a, 112b or computing device 120 should not be interpreted as limiting to any particular functionality or operation.

In an illustrative embodiment, the telecommunications environment 100 can include a number of additional components, systems and/or subsystems for facilitating communications with the telecommunications devices 112a, 112b and/or the event coordination service 102. The additional components can include one or more switches or switching centers 116 (in GSM embodiments, Mobile Switching Centers or MSCs) for establishing communications with the telecommunications devices 112a, 112b via the telecommunications network 114, such as a cellular radio access network, an IP-based telecommunications network based on the family of IEEE 802.11 technical standards ("WiFi") or IEEE 802.16 standards ("WiMax"), a converged wireless telecommunications network such as Unlicensed Mobile Access (UMA) or General Access Network (GAN), and other wired and wireless networks. The operation of telecommunications networks, such as telecommunications network 114 are well known and will not be described in greater detail. As illustrated in FIG. 1, the switching center 116 includes interfaces for establishing various communications via a communication network 118, such as the Internet, intranets, private networks and point to point networks, generally referred to as the "network." Although the telecommunications network 114 is illustrated as a single communication network, one skilled in the relevant art will appreciate that the communication network can be made up of any number of public or private communication networks and/or network connections.

As noted above, the telecommunications environment 100 can further include one or more network data sources 120 for providing external information to the event coordination service 102. The network data sources 120 may include a number of computing devices for obtaining and processing requests for information from either the event coordination service 102, the computing devices 122 and/or the telecommunications devices 112a, 112b.

Figure 2:
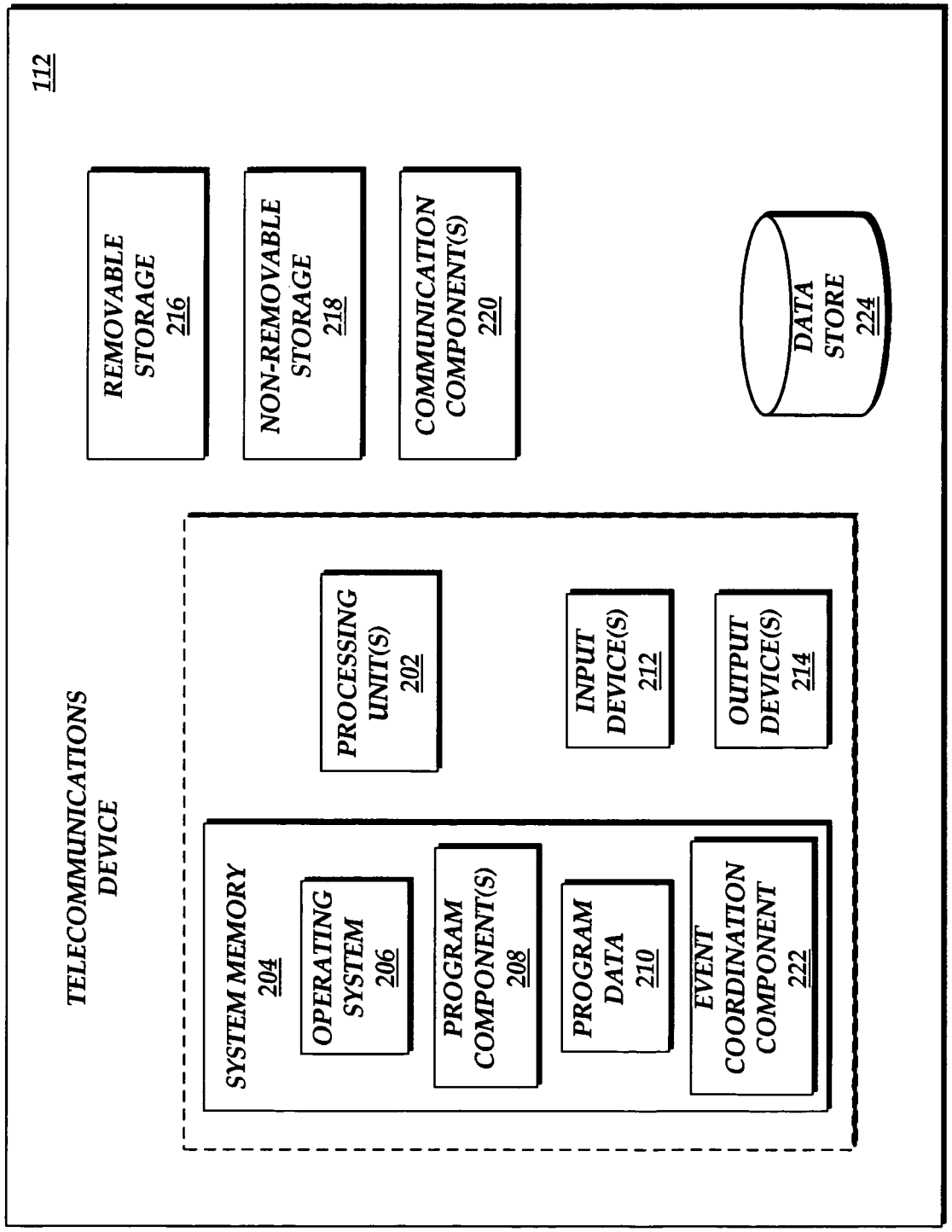
FIG. 2 is a block diagram illustrating components of a telecommunications device for use in providing and receiving event data during the event.

With reference now to FIG. 2, illustrative components of a telecommunications device, such as telecommunications device 112a, for use in providing data related to an event of interest or submitting a contribution to the event of interest will be described. The telecommunications device 112a may include one or more processing units 202, such as one or more CPUs. The telecommunications device 112a may also include system memory 204, which may correspond to any combination of volatile and/or non-volatile storage mechanisms. The system memory 204 may store information which provides an operating system component 206, various program components 208, program data 210, an event coordination component 222 and/or other components. As will be explained in greater detail below, the event coordination component 222 stored in system memory of the telecommunications device 112a may perform all or some of the functions described above in connection with the event coordination service 102. The above-enumerated list of components is representative and is not exhaustive of the types of functions performed, or components implemented, by the telecommunications device 112a. One skilled in the relevant art will appreciate that additional or alternative components may also be included in the telecommunications device 112a to carry out other intended functions such as a mobile telephone functions.

The telecommunications device 112a performs functions by using the processing unit(s) 202 to execute instructions provided by the system memory 204. The telecommunications device 112a may also include one or more input devices 212 (keyboard, mouse device, specialized selection keys, touch screen, etc.) and one or more output devices 214 (displays, printers, audio output mechanisms, etc.). Illustrative user interfaces for a telecommunications device 112a will be described with regard to FIGS. 5A-5C, 6, 9A, 9B, 10 and 11, described below.

With continued reference to FIG. 2, the telecommunications device 112a may also include one or more types of removable storage 216 and one or more types of non-removable storage 218. Still further, the telecommunications device 112a can include communication components 220 for facilitating communication via wired and wireless communication networks, such as the telecommunications network 114 and network 118 (FIG. 1). Examples of various communication protocols include, but are not limited to, Bluetooth, the family of IEEE 802.11 technical standards ("WiFi"), the IEEE 802.16 standards ("WiMax), short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA and similar technologies).

Figure 3:
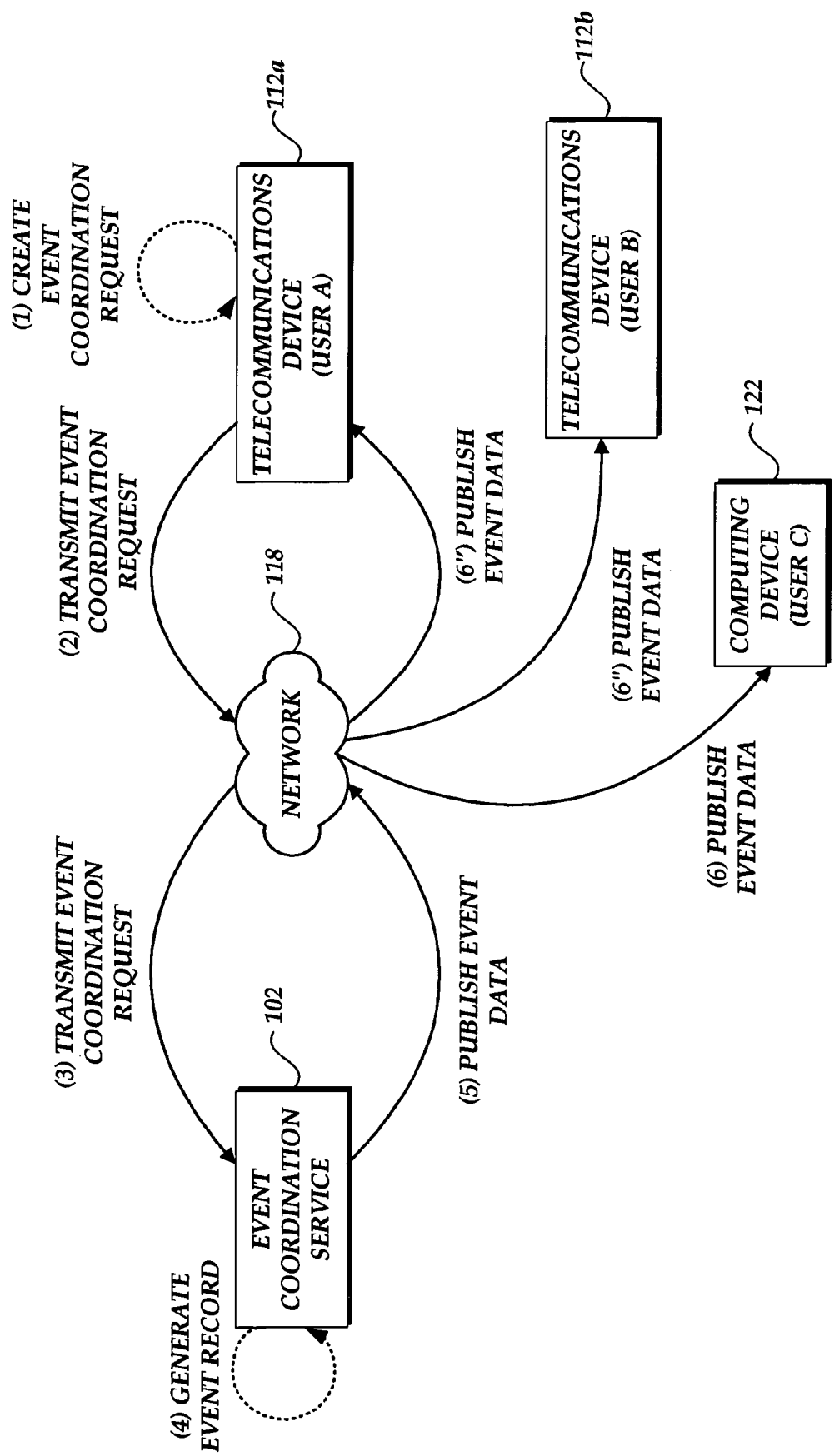
FIG. 3 is a block diagram of the telecommunications environment of FIG. 1 depicting an illustrative embodiment for publishing event data to the group of contacts.

FIG. 3 is a block diagram of the interaction between various components of the telecommunications environment 100 when user A of telecommunications device 112a requests coordination of an event among a group of contacts selected by user A. For purposes of the example, however, the illustration has been simplified such that many of the components utilized to facilitate communications are not shown (e.g., telecommunications network 114, switching centers 116, etc.). One skilled in the relevant art will appreciate that such components can be utilized and that additional interactions would accordingly occur without departing from the spirit and scope of the present disclosure.

As depicted in FIG. 3, user A creates an event coordination request using her telecommunications device 112a. For example, user A may be interested in coordinating a day at the beach with her family, and thus creates an event coordination request in order to provide her family with data related to the beach event. As will be described in more detail below, the event coordination request created by user A may include data related to the event, e.g., an event descriptor, start date/time, end/date time, location, message, etc. Such data may be entered directly by user A into an event user interface utilizing the telecommunications device 112a and/or obtained by the event coordination component 222 of the telecommunications device 112a. In some embodiments, user A will also select at least one group of contacts to whom the event data is to be provided and among whom the event will be coordinated as the event occurs. However, in other embodiments the event coordination component 222 of the telecommunications device 112a and/or the event coordination component 108 of the event coordination service 102 automatically selects the group of contacts to whom the event data is to be published, as will be described in more detail below. Accordingly, user A need not spend additional time or effort individually selecting her group(s) of contacts, directly entering his or her contacts or adding contacts from an address book or other contact manager component.

The telecommunications device 112a transmits the event coordination request to the event coordination service 102 via the network 118. The event coordination service 102 then generates an event record including the data related to the event and stores the event record in the event record data store 110. As noted above, the event coordination service 102 may automatically identify the group of contacts to whom the event data is to be provided. The event coordination service 102 includes the contact information (e.g., name, electronic mail address, telephone number, etc.) for each contact of the group(s) of contacts, whether selected or automatically identified (or perhaps pointers to such contact information) in the stored event record. In some embodiments, the event coordination service 102 obtains location and other supplemental data and includes such data in the event record as well. For example, the event coordination service 102 may obtain location data for the event (e.g., a street address and map for the event), location data for user A (e.g., GPS data for the telecommunications device 112a associated with user A), or location data for one or more of the contacts of the group (e.g., GPS data for the telecommunications device 112b associated with user B. an IP address for a computing device 122 associated with user C, etc.). Other supplemental data may include, but not be limited to, an image of the event location; a map of the event location; reviews for the event or event location; recommendations for related events, services, products, activities, and other locations; etc.

Once the event record is generated, the event coordination service 102 may publish or provide the event data to the group of contacts via an event user interface. In the illustrated example, the group of contacts includes user A, user B and user C. Accordingly, the event data is published by the event coordination service 102 in the illustrated example to telecommunications device 112a associated with user A, telecommunications device 112b associated with user B and computing device 122 associated with user C. Although reference is made herein to a telecommunications or other computing device associated with a contact, those skilled in the art will recognize the device is any device utilized by the contact to send and receive communication using an electronic mail account, mobile telephone account, etc. by virtue of a mobile telephone number, email address, etc. Accordingly, the device need not be a dedicated device or the same device.

In some embodiments, a notification that the event data is available is sent via the network 118 to the group of contacts as an electronic mail message, a SMS or MMS message, an electronic message that is published or posted for viewing by others (sometimes known as a "micro-blog" post, a "twitter" message or a "tweet"), a user interface generated on the display of the computing device 122/telecommunications device 112 (e.g., via a pop-up window, web page, tool bar message, etc.), a voice message, etc. In some embodiments, the type of notification published depends on the contact information stored in the event record for the contacts of the selected group(s). In other embodiments, the originating contact (e.g., user A in the illustrated example) indicates the type of notification to be published to certain contacts and/or mode of communication in the event coordination request. For example, in the case of user B's telecommunications device 112b, a notification that event data is available for coordination is published to the telecommunications device 112b in the form of a SMS message since the contact information for user B included a mobile telephone number. In another example, the contact information for user B may also include an email address for user B. Accordingly, the notification may be published to an email account associated with user B's email address and accessed by user B via the telecommunications device 112b or another telecommunications or computing device associated with user B. In some embodiments, the notification (e.g., the SMS message or electronic mail message), includes a Uniform Resource Identifier (URI) (or a shortened alias for redirection of a long URI) that identifies the location at the event coordination service 102 or another network data resource(s) that can be accessed to obtain the data related to the event. Accordingly, the contact to whom the notification has been published may utilize the URI to retrieve the event data using his or her telecommunications or other computing device and initiate generation of the event user interface on his or her telecommunication or other computing device for displaying such information. Those skilled in the art will recognize that the event user interface may be generated for display (directly or indirectly) by the event coordination service 102 and/or the event coordination component 222 of the telecommunications or other computing device.

Figure 4:
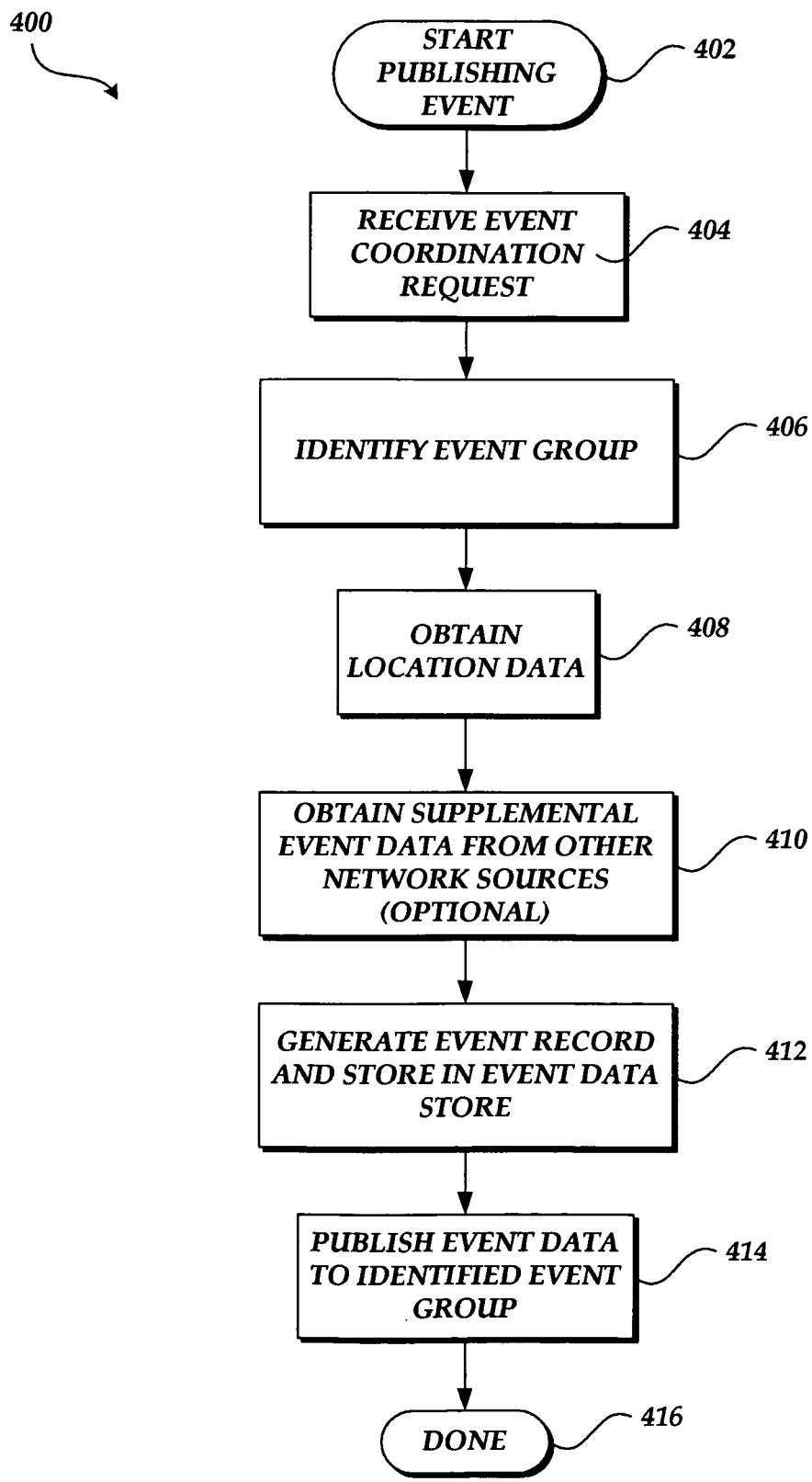
FIG. 4 is a flow diagram of an illustrative method of publishing event data to the group of contacts.

FIG. 4 is a flow diagram of an illustrative method 400 implemented by the event coordination service 102 to publish or provide event data to a group of contacts via an event user interface upon receipt of a request from a user. The routine begins in block 402 and proceeds to block 404 where the event coordination service 102 receives an event coordination request from a user. As described in more detail below the request may include, but not be limited to, an event descriptor, start date/time, end date/time, location, message, etc. as supplied by the user via a user interface (such as user interface 500 shown in FIG. 5A) that is presented on the display of the telecommunications or other computing device of the user requesting coordination for the event. Next, in block 406, the event coordination service 102 identifies the group(s) of contacts to whom the event data is to be published. In one embodiment, the user has selected one or more groups of contacts to which it belongs, so the identification of the group(s) are included in the request itself. In other embodiments, the group(s) of contacts are automatically identified by the event coordination service 102 without requiring selection by, or direction from, the user. For example, the event coordination service 102 may identify and obtain group contact information from an address book or other contact manager component maintained on the user's telecommunications of other computing device, maintained by the event coordination service 102 or maintained by or at another network data source 120, such as a telecommunications service, a social network service or a message publication service. In addition, a group of contacts automatically identified by the event coordination service 102 may include a subset of the user's contacts that is automatically identified by the event coordination service, in whole or in part. The subset of contacts may correspond to a portion of the user's contacts which are accessible via the user's telecommunications or other computing device. For example, a portion of the subset of contacts can be selected by the user of a telecommunications or other computing device, while a remaining portion of the subset of contacts are selected automatically by the service 102 based on one or more other factors. In one example, the factor can be a frequency of communication between user A and one or more user contacts accessible by the telecommunications device 112a. In this example, the event coordination component 222 (or another component of the telecommunications device 112a, such a contact management component (not shown)) monitors communications between the user and each of user A's contacts accessible by the telecommunications device 112a and maintains data associated with the monitored communications. Based on the monitored communications and corresponding maintained data, a frequency of communication may be determined between user A and each of user A's contacts. This information can then be used to determine the remaining portion of the subset of contacts. In one illustrative embodiment, the remaining portion of the subset of contacts can be selected based on the contacts that have been in communication with user A the most number of times. In other embodiments, the types of communications may be monitored between the user and the user's contacts, such as SMS messages, MMS messages, emails, instant messages, voice calls, and the like, and then the remaining portion of the subset of contacts may be selected based on the frequency of one type of communication or an aggregation of some or all types of communications. In addition, if aggregated, one type of communication can be weighted over other types. Even further, in other embodiments, only those communications initiated by the user may be monitored to select the remaining portion of the subset of contacts based on the user's frequency of initiating communication with each of the user's contacts.

Additionally or alternatively, in a further embodiment, a group of user contacts can be associated with a special rate plan offered by a telecommunications carrier providing communication services to the telecommunications device 112a. Specifically, user A may be provided a special rate associated with any communications made between user A and any of the contacts identified in a group. In addition to a special rate, the rate plan may have a variety of other parameters that may affect selection of the contacts to be included in the group. For example, in one embodiment, the group of contacts may be limited in number to correspond to a number of contacts with whom communications will be provided at a special rate. As another example, the group of contacts may be editable only after a specified period of time has elapsed from initial selection (whether by the user or partially by automated selection based on other factors such as frequency of communication information).

Accordingly, when the user submits an event coordination request to the event coordination service 102, the event coordination service may automatically identify a group of contacts to whom the event data is to be published without requiring the user herself to identify the group to whom the event data is to be published. In some embodiments, the automatically identified group of contacts will be presented to the user for confirmation and/or editing. However, in other embodiments, it will be assumed that no such confirmation is necessary since the automatically identified group of contacts may be relied upon as the most likely contacts with whom the user would wish to coordinate an event or as the most likely contacts to be interested participating in the event.

Referring again to FIG. 4, once the group of contacts is identified in block 406, the event coordination service 102 may obtain location data for inclusion in the event record in block 408. The location data may be for the event itself (e.g., street address, map, etc.), the originating user (e.g., GPS coordinates for the user obtained from a GPS component included in the user's telecommunications device or obtained using a location based service), or one or more of the contacts in the group (e.g., GPS coordinates, IP address, etc. of the telecommunications or other computing devices associated with the contacts). As will be described in more detail below, such location data may be used to augment the event data published by the event coordination service 102. Accordingly, the user is not required to include all or portion of such data in the event coordination request nor in an event contribution.

In other embodiments, location data may be applied as a filter to the group of contacts so as to select only those contacts of the group who may be able to participate in the event. For example, by applying the location data as a filter, the event coordination service 102 may provide event data to only those contacts of the group currently within or predicted to be within a certain distance or estimated arrival time of the event.

Next, in block 410, the event coordination service 102 may obtain other supplemental data for the event from other sources, such as network data sources 120, for inclusion in the event record. Such supplemental data may include, but not be limited to, images or videos related to the event; a map for the event; reviews for the event; recommendations for related events, services, products, activities, and other locations; weather data related to the event, etc. It will be appreciated that data related to an event may also include data related to points of interest within the event, data related to activities associated with the event, data related to services offered during the event, data related to contact information for the foregoing, data related to contacts participating in the event, etc. (such points of interest, activities, service, etc. may be referred to herein simply as "points of interest"). In some embodiments, the user may indicate in the event coordination request that she is interested in such supplemental data (e.g., by checking a box for including a map or recommendations, by indicating such in a set of user preferences maintained in the data store 224 of the user's telecommunications device or by the event coordination service 102, etc.).

In block 412, the event coordination service 102 generates an event record corresponding to the event coordination request that includes, for example, an event descriptor, start date/time, end date/time, location, message, etc. as supplied by the user, as well as the contact information for the group of contacts, location data and other supplemental data obtained in blocks 406, 408 and 410. The event coordination service 102 then stores the event record in the event record data store 110.

Once the event record is generated, the event coordination service 102 publishes or otherwise provides the event data (or a notification thereof) to the group of contacts in block 414. As noted above, a notification of the event may be published as an electronic mail message, a SMS or MMS message, an electronic message that is published or posted for viewing by others, a user interface display, etc. In some embodiments, the type of notification published depends on the contact information stored in the event record for the group of contacts or on a mode of communication preference. As also noted above, the notification (e.g., the SMS message or electronic mail message) may include a URI (or shortened URI) that identifies a network data source that can be accessed to obtain the data from the event record that is related to the event. Accordingly, the contact to whom the notification has been published may utilize the URI to retrieve and view the event data via an event user interface generated on his or her telecommunications or other computing device such as the event user interfaces depicted in FIGS. 6, 9A, 9B, 10 and 11. Upon publication of the event data, the method 400 ends in block 416.

Figure 5A:
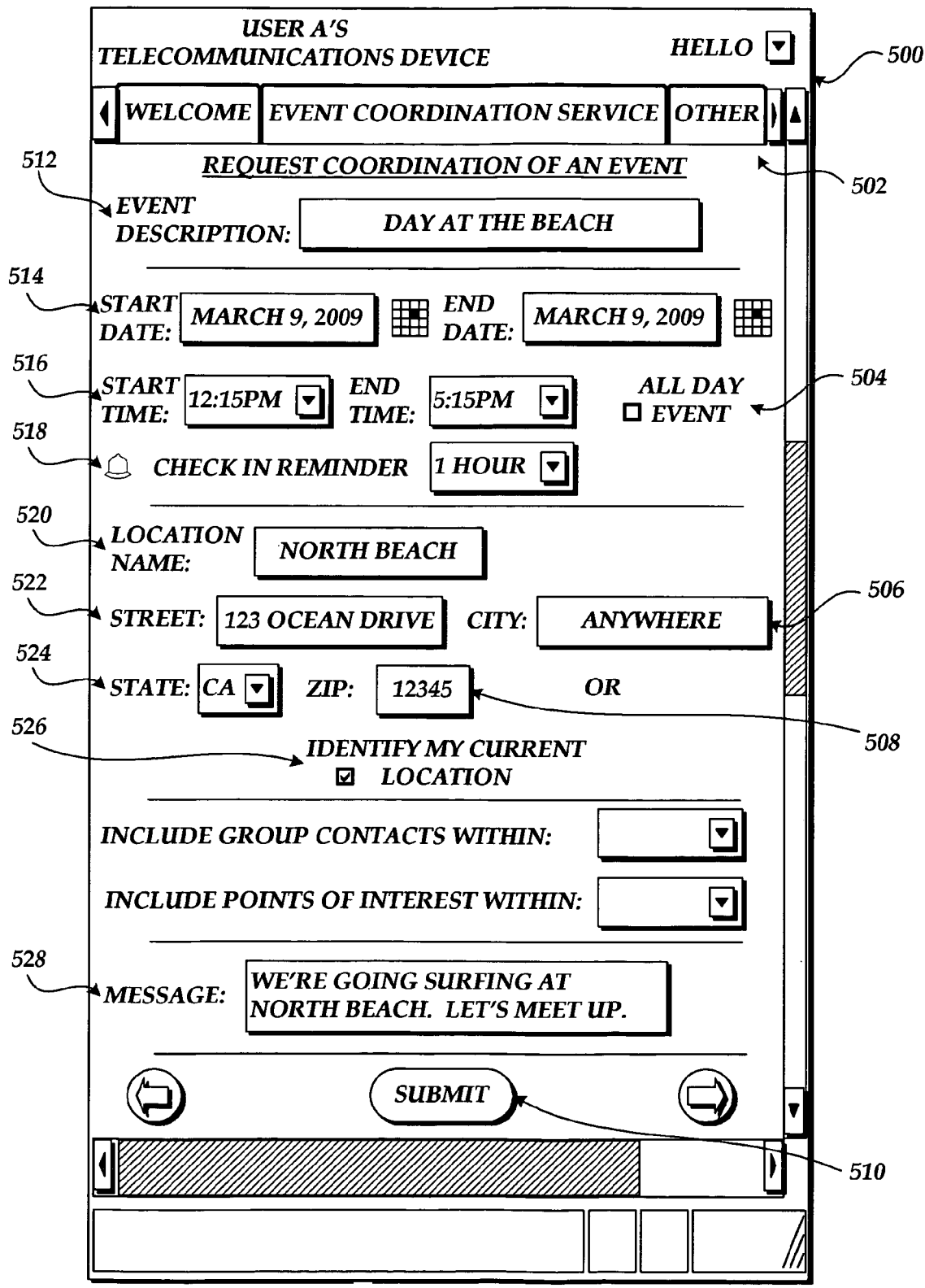

FIG. 5A is an illustrative user interface 500 generated on a telecommunications device, such as user A's telecommunications device 112a, for enabling a user to submit an event coordination request for at least one group of contacts. For example, user A may be interested in coordinating a day at the beach with her family, and thus creates an event coordination request in order to provide her family with data related to the beach event. Thus, user A creates an event coordination request 502 via user interface 500 generated by the event coordination service 102 and displayed on user A's telecommunications device (e.g., a mobile telephone). Accordingly, user A enters a descriptor 512 for the event (e.g., "Day at the Beach"), a start date and end date 512 and a start time and end time 516 for the event. Alternatively, the user may select an all day event by selecting a checkbox 504. In other embodiments the start/end date/time may be set to a default. In addition, user A may select a reminder option 518 (e.g., for 15 minutes, 1 hour, etc.) for issuing an alert (once or repeatedly) and reminding the group of contacts (including user A) to periodically check event data. Accordingly, as the event data is updated as described in more detail below, the telecommunications or other computing device associated with the contact will issue an alarm or other notification reminding the contact to review the event data. In this manner, the group of contacts can be reminded to check in and get updates during the event.

In addition, user A may enter location data for the event, such as a location name 520, street 522, city 506, state 524 and zip code 508. Alternatively, the user may indicate that her current location is the location for the event by selecting a location checkbox 526. As noted above, the event coordination service 102 may obtain current location data for the user A utilizing GPS, a location based service, etc. In addition, if the user has included a location name 520 for the event, but not a street address, the event coordination service 102 may obtain location data for the event, e.g., from a network yellow/white pages data source 120, from a combination of the same with the user's identified location, from prior event records associated with the user, a location based service, etc.

User A may further enter a message 528 (e.g., "We're going surfing at North Beach. Let's meet up."), which message may be included in the event data provided to a group contacts (or separately communicated to the group via an electronic message or voice message). In one embodiment, the user selects one or more groups of contacts to whom the event data is provided. In the example illustrated in FIG. 5B, user A selects a Family group 536 from drop-down menu 534 that also includes a Soccer Team group 538 and a Co-Workers group 540. In other embodiments, the event coordination service 102 automatically identifies the group of contacts as noted above.

In some embodiments, the user may further limit dissemination of the event data for coordination to a subset of the group selected. For example, as illustrated in FIG. 5B, user A may select an option 556 to include only those contacts within the Family group 536 that are currently located within five miles of the event location. In other embodiments, the user may limit the group by estimated arrival or travel time of contacts to the event location, age of contacts, gender of contacts, or any other criteria that may be deemed suitable by the user, the group, or the event coordination service 102. Accordingly, the options for such limitations depicted in FIG. 5B are illustrative only and should not be construed as limiting.

In yet other embodiments, the user may indicate points of interest related to the event for which the user wishes to provide data. In the example illustrated in FIG. 5C, user A selects Entertainment 544, Restaurants 550, Shopping 552 from a points of interest drop-down menu 542 that further includes Hotels 546, Gas Stations 548 and Municipal 554. Accordingly, when generating the corresponding event record, the event coordination service 102 will obtain data related to the selected points of interest from one or more network data sources 120. As noted above, such data may include, but not be limited to, images, videos, maps, reviews, recommendations, weather data related to the event, etc. In some embodiments, the network data source 120 may be a data source that provides event data specifically for the event indicated. For example, if the user is attempting to coordinate an event at a known amusement park, event data for the amusement park may be obtained from a network data source 120 affiliated with the amusement park. Accordingly, the event data obtained from the data source may include data regarding the attractions at the park, restaurants at the park, waiting times for attractions and restaurants, images of attractions, schedule of events at the park, transportation to/from/within the part, etc. In other embodiments, the event coordination service 102 collects the data from a variety of network data sources 120.

In some embodiments, the user may further limit the collection of event data for coordination to a subset of the points of interest selected or offered. For example, as illustrated in FIG. 5C, user A may select an option 558 to include only those points of interest selected from the menu 542 that are currently located within one mile of the event location. In other embodiments, the user may limit the points of interest for which data is obtained by estimated arrival or travel time of contacts to the point of interest, age of contacts, gender of contacts, or any other criteria that may be deemed suitable by the user, the group of the event coordination service 102. Accordingly, the options for such limitation depicted in FIG. 5C are illustrative only and should not be construed as limiting. When user A has completed the event coordination request 502, user A may submit the request to the event coordination service 102 upon selection of a submit control 510.

As described above, upon receipt of the event coordination request, the event coordination service 102 identifies the group(s) of contacts to whom event data is to be provided, generates an event record including data related to the event. The data may include the descriptor, start/end date/time, location, message and other data entered or options selected by user A, as well as any contact information, location data or other supplemental data the event coordination service 102 obtains. The event coordination service 102 then provides the event data to the group(s) of contacts via n event user interface such as event user interface 600 depicted in FIG. 6.

Figure 6:
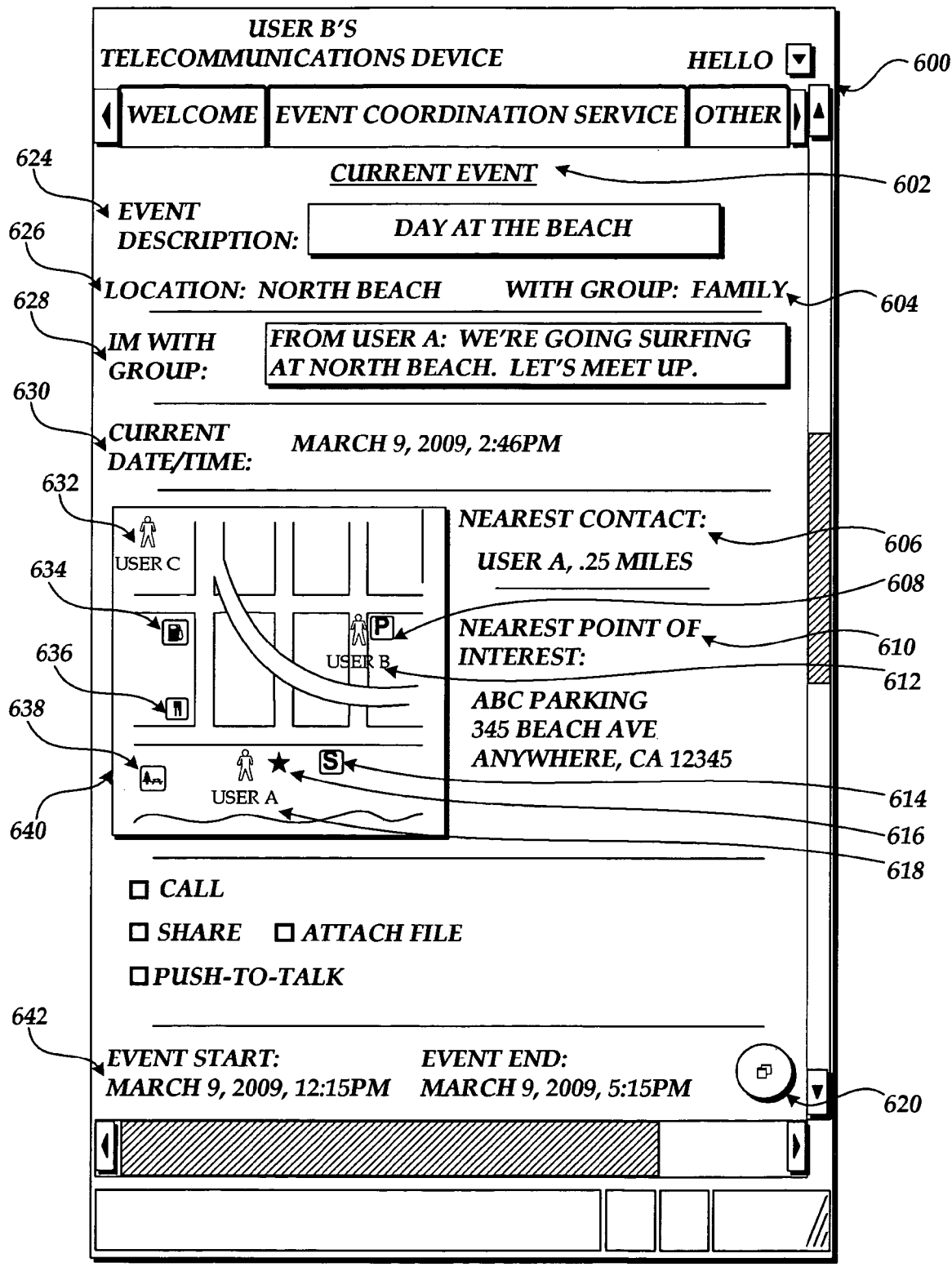
FIG. 6 is an illustrative user interface generated on a telecommunications device for displaying to a receiving contact data related to the event being coordinated.

As shown in FIG. 6, user B has received a notification for the event "Day at the Beach," and thus event user interface 600 has been generated on user B's telecommunication device 112b. In one embodiment, event user interface 600 is persistently displayed on the telecommunications device 112b for the duration of the event so that user B can have ready access to the event data as it is updated and so that user B can efficiently and quickly make his own contributions to the event. Accordingly, in the illustrated example, the event user interface 600 takes the form of a "top-of-the-device" user interface and is thus substantially continuously displayed on the device 112b until some other action is taken by the user B, e.g., user B navigates to another user interface, user B initiates a voice call, etc. However, upon completion of the action, the event user interface 600 reappears on the "top-of-the-device" for ready reference by the user B. In addition, user B may choose to minimize or reduce the event user interface 600 to an icon or some other smaller, graphical representation, such as icon 1106 shown in FIG. 11 described in more detail below. In the illustrated example, user B chooses to do so by selecting a minimize control 620. The resulting graphical representation may then be persistently displayed upon the user B's telecommunications device 112b. An alert indicating event data updates may also be issued by user B's computing device while the graphical representation is being displayed so that the user B is reminded to view event user interface. The event user interface 600 and its reduced graphical representation may cease being persistently represented and/or further updated after completion of the event (as defined, for example, the end date/time specified by user A when requesting the event for coordination). Accordingly, after the event is over, the telecommunications device 112b can revert to its normal idle state. It will be appreciated that in some embodiments, the event user interface 600 or its graphical representation may remain displayed on "top-of-the-device" for a predetermined amount of time or may remain accessible by the contacts of the group for historical purposes. In yet other embodiments, one or more contacts of the group may continue to update the event data after the completion of the event for historical purposes as well. For example, a contact may add digital content (e.g., images, video, comments, files, etc.) or other data to further memorialize and keep a record of the event in a manner similar to a scrapbook. The event data may then be accessed by the contacts of the group.

Referring again to FIG. 6, event user interface 600 includes the data found in the corresponding event record for the current event 602, such as a descriptor 624 for the event (i.e., "Day at the Beach"), location data 626, a current date/time 630, and the start/end date/time 642. In addition, in the illustrated example, the user interface 600 also includes a map 640 for the event the includes indicators 634, 636, 638, 608 and 614 for various points of interest, an indicator 616 identifying the event location on the map, and indicators 618, 612 and 632 for each contact of the group to whom the event data was provided. Accordingly, user B can assess at a glance what points of interest are available, where the contacts of the group are located, etc. In one embodiment, the map is continuously or regularly updated or refreshed with additional data. Accordingly, as contacts of the group change location, their respective indicators within the map change location as well. Those skilled in the art will recognize that the map included in an event user interface may be any type of map to which the event coordination service 102 may have access and that is suitable for depicting the event location. Accordingly, the map may be a street map, satellite map, a contour map, etc., displayed at any scale or level of detail appropriate for depicting the positions of the contacts relative to the event location. In addition, the scale or level of detail may change as the relative positions of the contacts change.

As also illustrated in FIG. 6, the event user interface 600 may include additional data related to the event that may be of interest to the contacts of the group. For example, the nearest contact 606 and nearest point of interest 610 to user B may be identified for user B's quick reference. Those skilled in the art will appreciate that virtually any type of data related to the event may be included in the event user interface without departing from the scope of the present disclosure. Accordingly, the examples of such data depicted in FIG. 6 are illustrative only, and should not be construed as limiting. In addition, the contact to whom the event user interface is being displayed may also request additional or other data from the event coordination service 102 or other network data sources 120 via other menus, user interface controls or user interfaces (not shown).

As will be described in more detail below, a contact for whom the event user interface is being displayed may also initiate voice (such a voice call, video conference call, etc.) communication or electronic communication with the other contacts of the group from the event user interface. In the illustrated example, the default mode of electronic communication is instant messaging. Accordingly, user B can send an instant message to the group of contacts directly from the event user interface 600 by entering the message into an IM with group field 628. (In the illustrated embodiment, the field 628 is seeded with the original message from user A.). Further interaction with the event user interface, including submission of contributions from contacts to the event are described in more detail below.

Figure 7:
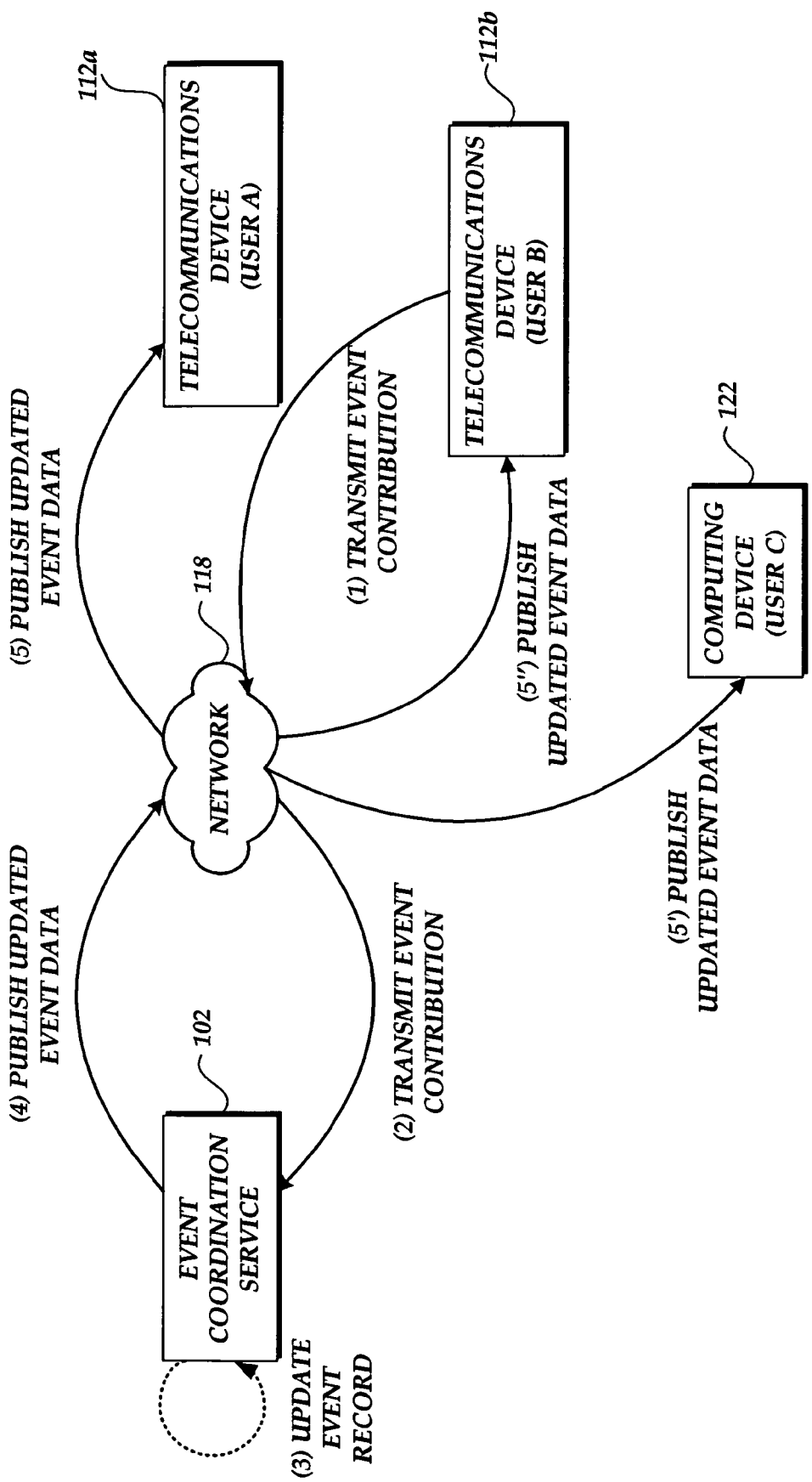
FIG. 7 is a block diagram of the telecommunications environment of FIG. 1 depicting an illustrative embodiment for publishing updated event data to the group of contacts.

FIG. 7 is a block diagram of the interaction between various components of the telecommunications environment 100 when user B of telecommunications device 112b submits an event contribution to the event coordination service 102. As depicted in FIG. 7, when user B submits an event contribution, it is transmitted to the event coordination service 102 via the network 118. The event coordination service 102 then updates the corresponding event record to include the event contribution from user B and stores the updated event record in the event record data store 110. Because the event record has been updated, the event coordination service 102 publishes updated event data to the group of contacts identified by the service 102. In some embodiments, the event coordination service 102 simply identifies the same group of contacts as those to whom the prior event data was published (i.e., the group of contacts selected by user A in the illustrated example), which group of contacts is already identified in the event record. However, in other embodiments, user B and/or the event coordination service 102 may add to or modify the group of contacts. In such cases, the event coordination service 102 adds the contact information (e.g., name, electronic mail address, mobile telephone number, etc.) for the contacts (or perhaps pointers to such contact information) to the updated event record. In some embodiments, the event coordination service 102 obtains further location and supplemental data and includes such data in the updated event record as well. For example, the event coordination service 102 may obtain new location data for points of interest identified or suggest by user B. or updated location data for the group of contacts to whom the updated event data is provided.

Once the event record is updated, the event coordination service 102 may publish updated event data to the group of contacts via an event user interface. Accordingly, in the illustrated example, the updated event data is published by the event coordination service 102 to telecommunications device 112a associated with user A, telecommunications device 112b associated with user B. and computing device 122 associated with user C. As noted above, a notification to retrieve the updated event data may be sent via the network 118 as an electronic mail message, a SMS or MMS message, etc. to the group of contacts as opposed to sending the updated data itself for use is refreshing the event user interface. Although in the illustrated example, the updated event data is depicted as being provided to the group of contacts after receipt of an event contribution, those skilled in the art will recognize that the updated event data may be published or provided to the devices associated with the contacts of the group on a continuous, periodic or a periodic basis and in response to a push request by the event coordination service 102 or a poll request by the devices. Accordingly, the event user interface may be updated or refreshed without requiring interaction by the contact with her associated telecommunications for other computing device. In one embodiment, such updating will continue for the duration of the event, as defined by the end date/time specified in the event coordination request.

Figure 8:
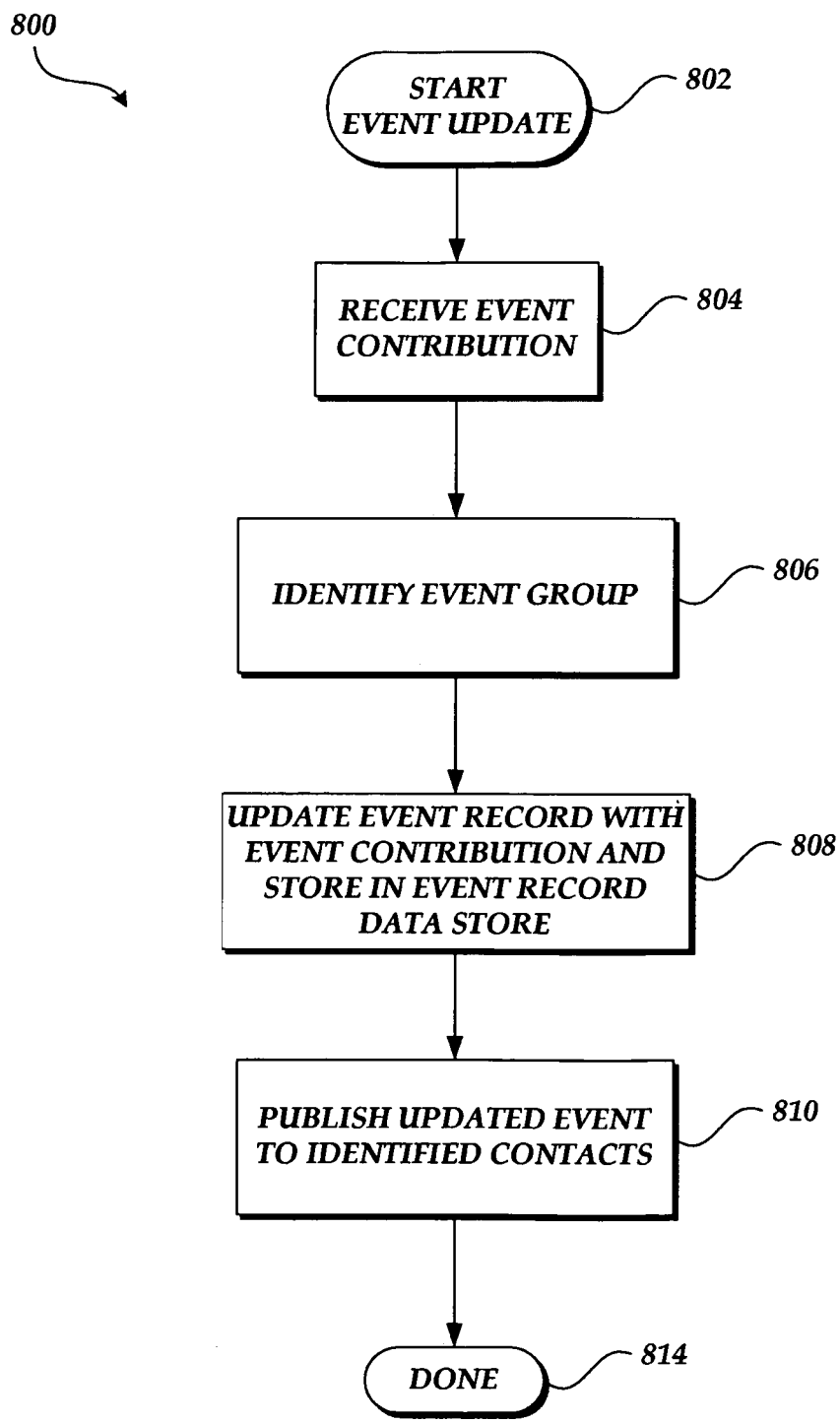
FIG. 8 is a flow diagram of an illustrative method for publishing updated event data to the group of contacts.

FIG. 8 is a flow diagram of an illustrative method 800 implemented by the event coordination service 102 to update event data upon receipt of an event contribution. The routine begins in block 802 and proceeds to block 804 where the event coordination service 102 receives an event contribution from a contact. As described in more detail below the event contribution may include data related to the event that may be of interest, for example, restaurant reviews, attraction prices, location information, images, videos, etc. In this manner, a group of contacts can collaboratively coordinate the event and share event data in real-time or near real-time while the event is occurring. It will be appreciated that data related to an event may also include data related to points of interest within the event, data related to activities associated with the event, data related to services offered during the event, data related to contact information for the foregoing, data related to contacts participating in the event, etc. (such points of interest, activities, service, etc. may be referred to herein simply as "points of interest"). Accordingly (and as described above in connection with the event coordination request), when updating the corresponding event record, the event coordination service 102 may obtain data related to the event from one or more network data sources 120. Next, in block 806, the event coordination service 102 identifies the group(s) of contacts to whom the updated event data is to be provided. In one embodiment, the group(s) of contacts is automatically identified by the event coordination service 102 from the event record as the group of contacts initially selected by user A (i.e., the user who sent the event coordination request). Accordingly, the initially selected group becomes a group for the receiving contacts as well, at least temporarily, for the event.

Once the group(s) of contacts is identified in block 806, the event coordination service 102 may update the event record with the event contribution submitted by the contact, as well as any additional contact, location or other supplemental data it may obtain. As noted above, location data may be applied as a filter to the identified group of contacts so as to provide updated event data only those contacts who are still able to participate. For example, by applying the location data as a filter, the event coordination service 102 may publish updated event data to only those contacts of the group currently within or predicted to be within a certain physical distance or estimated arrival time of the event or a point of interest therein. Accordingly, if a contact has moved beyond such a distance or arrival time, the event coordination service 102 may not publish the updated event data to the contact.

Next, in block 810, the event coordination service 102 publishes updated event data from the updated event record (or found according to pointers or links stored in the event record) to the group(s) of contacts. As noted above, a notification to retrieve the updated event data may be sent via the network 118 as an electronic mail message, a SMS or MMS message, etc. to the group of contacts as opposed to sending the updated data itself for use is refreshing the event user interface. In other embodiments, the event user interface is simply updated or refreshed with the updated event data. In one embodiment, such updating will continue for the duration of the event, as defined by the end date/time specified in the event coordination request. After the event ultimately concludes, display of the event user interface ceases (at least at the "top-of-the-device") in some embodiments, as the group of contacts likely no longer needs immediate or ready reference to the event.

Figure 9A:
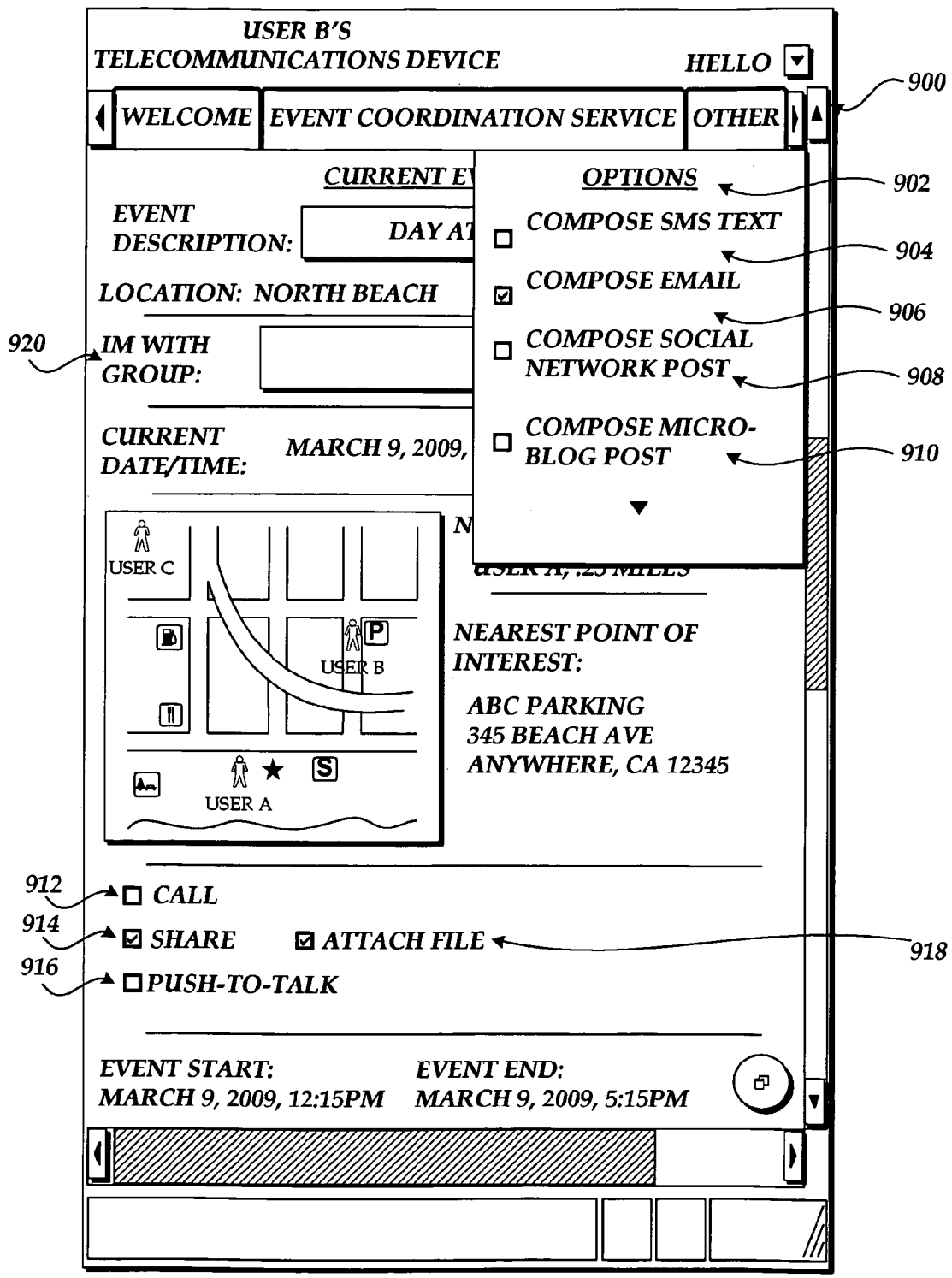
FIGS. 9A and 9B are illustrative user interfaces generated on a telecommunications or other computing device for enabling a receiving contact to contribute to coordination of the event.
Figure 9B:
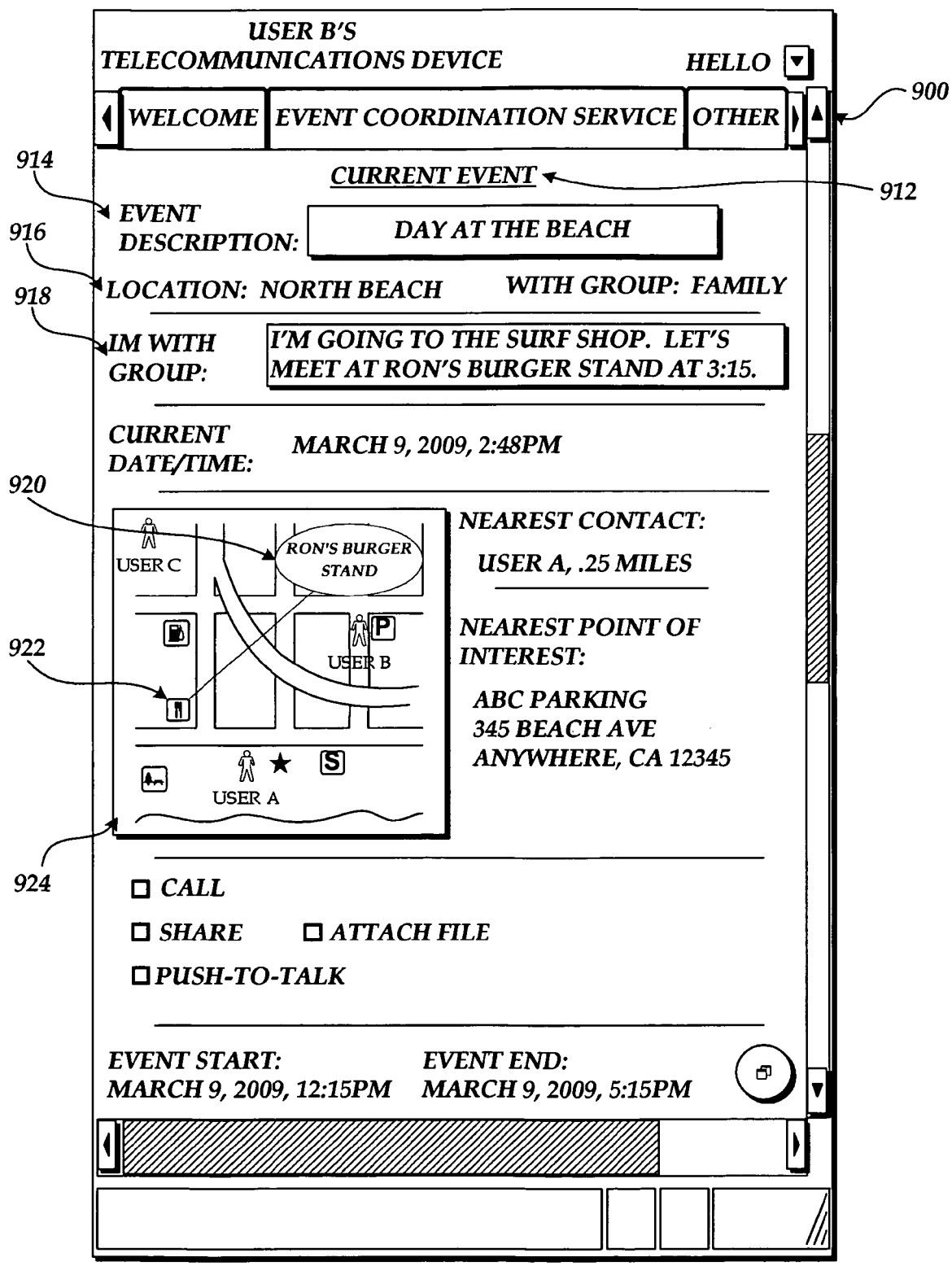

As discussed above, contacts of the group may make contributions to the event and initiate communication with one another during the duration of the via the event user interface. An illustrative event user interface 900 from which a contact, such as user B. can make contributions and initiate communication is shown in FIGS. 9A and 9B. For example, in FIG. 9A, user B may select a call option 944 to initiate a voice call to another contact in the group. This may launch another user interface (not shown) from which user B may select a telephone number for the contact. As yet another example, user B may select a share option 646 to initiate an electronic communication with the other contacts of the group. Such an electronic communication may include, but not be limited to, an email message, a SMS message, an MMS message, an instant message, a micro-blog message, or a post to an account at a social network service to which the group belongs. In the illustrated embodiment, the default mode of electronic communication is instant messaging. Accordingly, user B can simply send an instant message to the group of contacts directly from the event user interface 900 by entering the message into an IM with group field 920. However, if user B wishes to use another mode of communication, e.g., email, SMS message, etc., user B may select a share option 914, which may launch another user interface (not shown) or a menu from which user B may select the mode of communication, the contact information (e.g., email address, telephone number, etc.) for the contacts of the group, etc. In one embodiment, it is not necessary for user B to provide the contact information for the group as such information is already stored in the corresponding event record. In the illustrated example, user B can select the mode of electronic communication from a drop-down menu 902 that includes the options of an SMS message 902, an email 904, a post to an account at a social network service 908 and a micro-blog post 910. By selecting such options, the contact can send an electronic communication to all the contacts of the group simultaneously further facilitating coordination of the event. In addition, those skilled in the art will recognize that the electronic communication options depicted in the drop-down menu 902 are illustrative only, and thus should not be construed as limiting.

In yet other embodiments, the contact for whom the event user interface is being displayed may also attach additional data related to the event to the electronic communication by selecting, for example, an attach file option 918. Accordingly, the contact may attach an image, video or other content file to the electronic communication and send such data to the entire group. For example, user B. while participating in the beach event, may come across and take an image of an interesting street performer at the beach using the camera functionality of user B's telecommunications device 112b. Using the attach file option 918, user B may attach the image to an electronic communication sent to the contacts of the group, along with a message suggesting that they join him to watch the street performer shown in the picture. Since the location of user B is already indicated in the map provided in the event user interface, the contacts of the group can quickly discern from the user interface where user B and the street performer are located and join user B. Absent such an event user interface, user B would have to provide detailed instructions and/or location information to the group of contacts to direct them to the appropriate location, which may be time consuming, and thus institute delay in the event.

In yet another embodiment, the contact for whom the event user interface is being displayed may also initiate other types of voice communication from the event user interface. In the illustrated example, event user interface 900 includes a push-to-talk option 916. Selection of the push-to-talk option 916 enables user B to talk with the other contacts of the group as if using a walkie-talkie, provided that the telecommunications or other computing devices associated with the contacts are equipped with a radio frequency interface with access to a specialized mobile radio (SMR) service. Although not shown, other voice communication options may be made available to contacts of the group via the event user interface without departing from the scope of the present disclosure. Examples of such voice communication options include, but are not limited to, teleconferencing, voice chat, voice messaging, etc.

As noted above, contacts of the group can also make contributions to the event from an event user interface. In the example illustrated in FIG. 9B, user B initiates an instant message in field 918 informing the group that he is "going to the surf shop" and suggesting that they "meet at Ron's Burger Stand at 3:15." In addition, user B has chosen Ron's Burger Stand as a point of interest from the map 914 provided in the event user interface 900. In one embodiment in which user B's telecommunication device 112b is equipped with a touch screen, user B may select the point of interest by touching the screen at the position indicated by the indicator 922 for the point of interest. As a result a descriptor 920 for the point of interest (e.g., "Ron's Burger Stand") may be presented to userB. Accordingly, in one embodiment, upon submission of the instant message, the telecommunications device 112b submits user B's event contribution (e.g., the selection of the point of interest "Ron's Burger Stand") to the event coordination service 102. The event coordination service 102 may then obtain additional data regarding the point of interest from a network data source 120 and store such data in the corresponding event record for further dissemination to the group of contacts.

Figure 10:
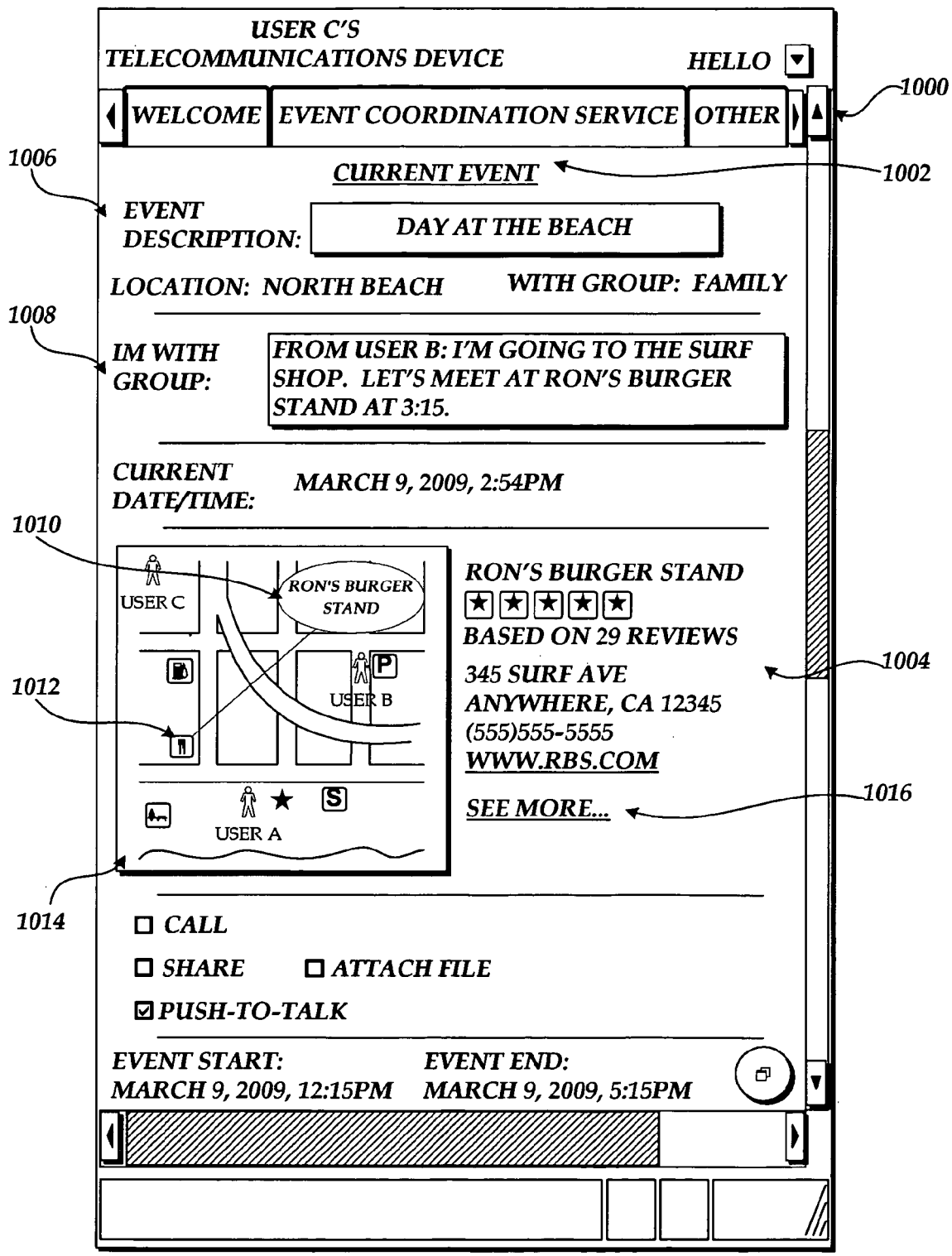
FIG. 10 is an illustrative user interface generated on a telecommunications or other computing device for displaying updated event data to a receiving contact.

In one embodiment, the event coordination service 102 obtains at least one of a recommendation for the point of interest, a review for the point of interest, a location for the point of interest and contact information for the point of interest. Such data may be obtained from a single network data source, such a social network service or other service that provides user reviews, recommendations, addresses, phone numbers/email addresses and other information (e.g., menus, product listings, service listings, etc.) for points of interest. Alternatively, the event coordination service 102 can obtain such data from a variety of network data sources 120 and aggregate the data for provision to the group of contacts. Once obtained, the event coordination service 102 can provide the updated event data to the contacts of the group via the event user interface. For example, as illustrated in FIG. 10, an event user interface 1000 for the current event 1002 (i.e., a "Day at the Beach" 1006) generated on the computing device 122 associated with user C is updated with user B's suggestion that the group meet at Ron's Burger Stand at 3:15. More specifically, user C receives user B's instant message regarding the same in an IM with group field 1008. In addition, a map 1014 for the event provided in the event user interface 1000 is updated to reflect that the point of interest 1012 suggested by user B is Ron's Burger Stand as evidenced by a descriptor 1010. Moreover, supplemental data 1004 related to Ron's Burger Stand that was obtained by the event coordination service 102 is also displayed in the event user interface 1000. Specifically, the supplemental data in the illustrated example includes a recommendation for Ron's Burger Stand (e.g., five stars based on 29 reviews) and an address, telephone number and Internet address for Ron's Burger Stand. Should user C wish to see more data regarding Ron's Burger Stand, other recommended points of interest in the event, etc., user C may activate a URI 1016 to access such additional data.

It will be appreciated from the above discussion that contacts receiving such updated event data may have ready access to it via the event user interface. As a result, contacts of the group can quickly discern from the event user interface where contacts are meeting, what the points of interest are, how interesting the points of interest may be, etc. Absent such an event user interface, the contacts of the group would have to take additional, time consuming measures to obtain such data and disseminate it others in the group, thus proving only haphazard event coordination. Although not shown, other event data may be submitted by and provided to contacts of the group without departing from the scope of the present disclosure. Therefore, those skilled in the art will recognize that examples of such data described above and depicted in the figures are illustrative only, and not to be construed as limiting.

Figure 11:
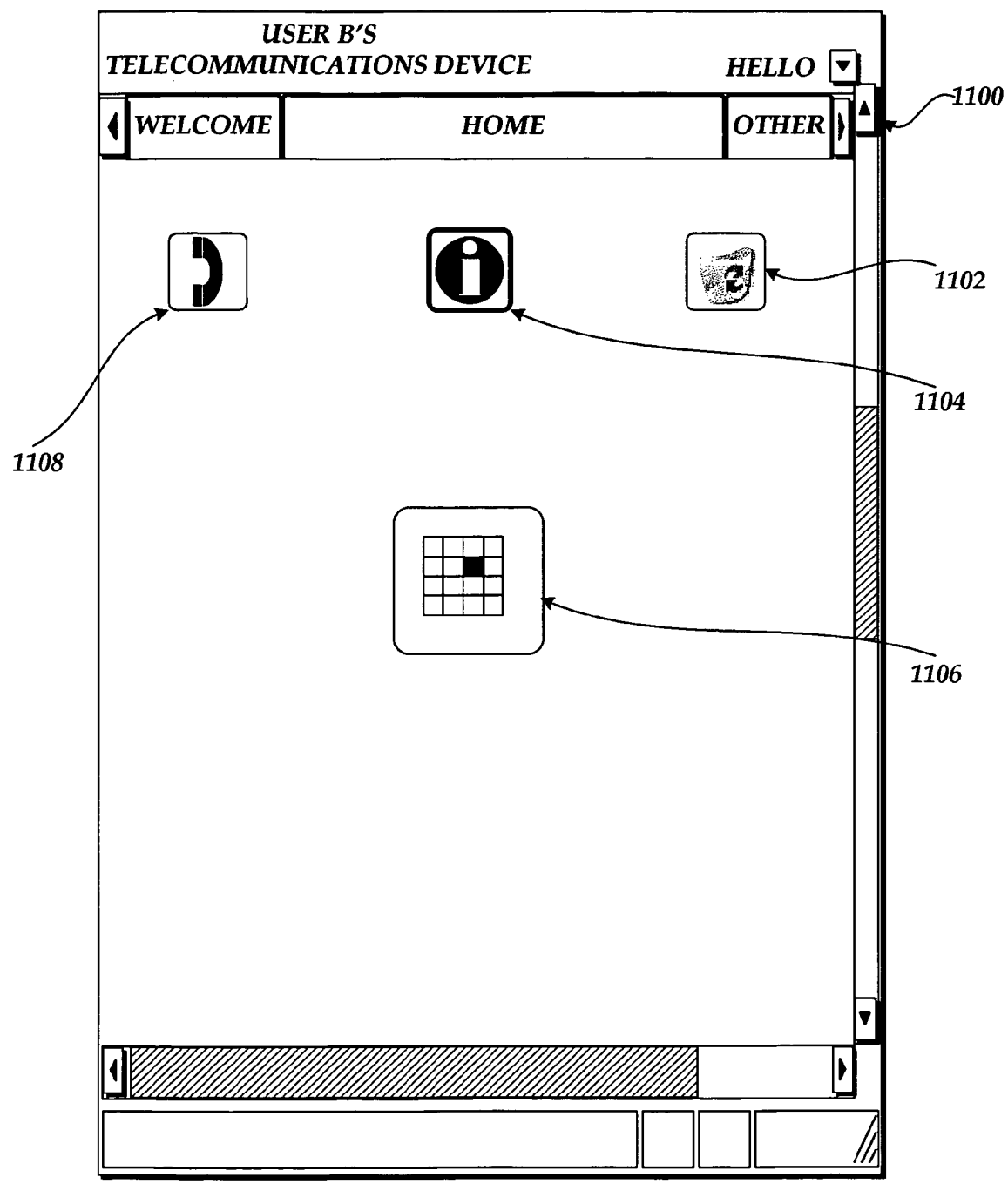
FIG. 11 is an illustrative user interface generated on a telecommunications or other device for displaying a minimized graphical representation of the event data.

As also appreciated from the above discussion, a contact may choose to minimize or reduce the event user interfaces depicted in FIGS. 6, 9A, 9B and 10 to an icon or some other smaller, graphical representation, such as icon 1106 shown in FIG. 11. For example, user B may choose to do so by selecting a minimize control 620 as shown in FIG. 6. The resulting graphical representation may then be persistently displayed upon the user B's telecommunications device 112b, e.g., as an icon in a home or idle user interface 110 along with other icons 1108, 1104 and 1102 representing other functionality or options. Although the reduced graphical representation can take a variety of forms, the graphical representation is a thumbnail image or version of the map included in the event user interface in one embodiment. The reduced graphical representation (or corresponding event user interface) may cease being persistently represented and/or further updated after completion of the event (as defined, for example, the end date/time specified by a contact when requesting the event for coordination). Accordingly, after the event is over, the telecommunications or other computing device upon which the graphical representation appears can revert to its normal idle state. It will be appreciated that in some embodiments, the event user interface or its graphical representation may remain displayed on the "top-of-the-device" for a predetermined amount of time after conclusion of the event or may remain accessible by the contacts of the group for historical purposes. For example, although not illustrated, a history of the event may be maintained by the event coordination service 102 and made accessible to the contacts of the group. For example, the event history allows contacts to review the contributions and interactions of the contacts of the group that took place over the duration of the event.

Those skilled in the art will also recognize that the user interfaces depicted in depicted in FIGS. 5A-5C, 6, 9A, 9B, 10 and 11, are illustrative, and thus may contain more, less or different data, controls, etc. than that depicted without departing from the spirit and scope of the present disclosure. For example, the event user interfaces displayed to contacts of a group may include an opt-out control for selection by a contact who does not wish to participate in the event. In such cases, an indication may be provided to the event coordination service 102 that the contact is no longer interested in the event. Accordingly, the event coordination service 102 may cease display of the event user interface (at least at the "top-of-the-device"). In other embodiments, an indication that the contact is no longer interested in the event may be provided to or detected by the event coordination service 102 if the contact is no longer within a certain distance of the event or any point of interest therein, of if the contact has ceased to communicate with other contacts or to submit updates for the event for a certain period of time. In such cases, the event coordination service 102 may also cease display of the event user interface (at least at the "top-of-the-device"). In addition, the user interfaces displayed on a telecommunications device 112a, 112b may be the same as or different from those displayed on a computing device 122. For instance, due to mobile phone memory constraints, bandwidth constraints, limited screen size, and/or input interfaces (e.g., touch screen, keyboard, etc.), the user interface generated on the device may vary.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for enabling a group of contacts to share data related to a social event as the social event occurs, the system comprising:
   a data store that stores data related to one or more social events; and
   a computing device in communication with the data store, the computing device operative to:
      obtain data related to a social event of interest to the group of contacts, which data is stored in the data store and updated as the social event occurs with data obtained from one or more external data sources and one or more contacts of the group; and
      cause the data related to the social event of interest to be displayed on one or more computing devices, each computing device associated with a contact of the group, wherein the data related to the social event of interest is displayed in an area of prominence on the computing device for a duration of the social event until another action is taken by the contact associated with the computing device, in which case the data related to the social event of interest is automatically redisplayed in the area of prominence on the computing device following completion of the action taken by the contact.

2. The system of claim 1, wherein the data obtained from the one or more external data sources includes a map upon which points of interest associated with the social event are indicated.

3. The system of claim 2, wherein the data obtained from the one or more external data stores include additional data related to at least one point of interest.

4. The system of claim 3, wherein the additional data related to at least one point of interest is displayed in conjunction with the map.

5. The system of claim 1, wherein the data obtained from the one or more external data sources includes data related to at least one point of interest associated with the social event.

6. The system of claim 5, wherein data related to the at least one point of interest associated with the social event includes at least one of a recommendation for the point of interest, a review for the point of interest, a location for the point of interest, and contact information for the point of interest.

7. The system of claim 1, wherein the computing device is further operative to cease causing the data related to the social event of interest to be displayed in an area of prominence on the one or more computing devices after at least one of completion of the social event and an indication that the contact associated with the computing device is not interested in the social event.

8. The system of claim 1, wherein the data obtained from the one or more external sources is requested by one or more contacts of the group.

9. The system of claim 1, wherein the data obtained from the one or more external sources is automatically obtained from the one or more external sources.

10. A system for providing event data to a group of contacts, the system comprising:
   a data store that stores event records, each event record including data related to a social event; and
   a computing device in communication with the data store, the computing device configured to:
      obtain, from a mobile computing device, a request to coordinate a social event of interest to a group of contacts who are to participate in the social event, the request including data related to the social event of interest to the group of contacts who are to participate in the social event;
      generate an event record based on the request obtained from the mobile computing device, the event record including the data related to the social event of interest to the group of contacts, wherein the data is updated as the social event occurs with data obtained from an external data source and data obtained from at least one contact of the group; and
      publish the data related to the social event of interest to one or more contact computing devices, each contact computing device associated with a contact of the group, wherein the event data is published such that the data related to the social event of interest is displayed substantially continuously upon the contact computing device as the social event occurs and the data is updated, and until another action is taken by the contact associated with the contact computing device, in which case the data related to the social event of interest is automatically redisplayed substantially continuously upon the contact computing device following completion of the action taken by the contact.

11. The system of claim 10, wherein the data obtained from the external data source includes a data related to a point of interest associated with the social event.

12. The system of claim 11, wherein data related to a point of interest associated with the social event includes at least one of a recommendation for the point of interest, a review for the point of interest, a location for the point of interest, and contact information for the point of interest.

13. The system of claim 10, wherein the data obtained from the external source is requested by at least one contact of the group.

14. The system of claim 10, wherein the data obtained from the external source is requested by the computing device.

15. The system of claim 10, wherein the computing device is further operative to cease publishing the data related to the social event of interest to the one or more contact computing devices and the mobile computing device upon completion of the social event.

16. The system of claim 10, wherein the external data source is at least one of a location based service, a review service and a recommendation service.

17. The system of claim 10, wherein the external data source is affiliated with the social event.

18. A method for providing data related to a social event to a group of contacts as the social event occurs, the method comprising:
as implemented by one or more computing devices configured with specific executable instructions,
generating an event record including data related to a social event of interest to a group of contacts, which event data is updated as the social event occurs with data obtained from one or more external data sources; and
causing the event data to be displayed upon one or more computing devices, each computing device associated with a contact of the group, wherein the event data is displayed persistently upon the computing device as the social event occurs and wherein the event data that is displayed persistently upon the computing device until another action is taken by the contact associated with the computing device, in which case the event data is automatically redisplayed persistently upon the contact computing device following completion of the action taken by the contact.

19. The method of claim 18, wherein the data obtained from the one or more external data sources includes a data related to at least one point of interest associated with the social event.

20. The method of claim 19, wherein data related to the at least one point of interest associated with the social event includes at least one of a recommendation for the point of interest, a review for the point of interest, a location for the point of interest, and contact information for the point of interest.

21. The method of claim 18, wherein the data obtained from the one or more external data sources includes a map upon which points of interest associated with the social event are indicated.

22. The method of claim 21, wherein the data obtained from the one or more external data sources is displayed in conjunction with the map.

23. The method of claim 18, wherein event data is further updated as the social event occurs with data obtained from at least one contact of the group.

24. The method of claim 18 further comprising ceasing to cause the event data to be persistently displayed upon the computing device after at least one of completion of the social event and an indication that the contact associated with the computing device is not interested in the social event.

25. The method of claim 18, wherein the data obtained from the one or more external sources is requested by at least one contact of the group.

26. The method of claim 18, wherein the data obtained from the one or more external sources is automatically obtained from the one or more external sources.

27. The method of claim 18 further comprising enabling a contact to initiate communication with one or more other contacts in the group as the social event occurs.

28. The method of claim 18, wherein at least one of the external data sources is at least one of a location based service, a review service and a recommendation service.

29. The method of claim 18, wherein at least one of the external data sources is affiliated with the social event.

30. A non-transitory computer-readable medium having a computer-executable component for enabling a group of contacts to collaborate with each other during a social event, the computer-executable component comprising:
an event collaboration component configured to:
obtain data related to a social event of interest to the group of contacts as the social event occurs, wherein the data is obtained from one or more external data sources and one or more contacts of the group; and
generate a user interface including said data for display on a computing device associated with a contact of the group, wherein the user interface is a top level user interface displayed on the computing device during the social event, wherein the top level user interface is updated during the social event as data related to the social event is obtained from the one or more external data sources and the one or more contacts of the group, and wherein the top level user interface is substantially continuously displayed during the social event until another action is taken by the contact and is automatically redisplayed upon completion of the action.

31. The non-transitory computer-readable medium of claim 30, wherein the data obtained from the one or more external data sources includes a data related to at least one point of interest associated with the social event.

32. The non-transitory computer-readable medium of claim 31, wherein data related to the at least one point of interest associated with the social event includes at least one of a recommendation for the point of interest, a review for the point of interest, a location for the point of interest, and contact information for the point of interest.

33. The non-transitory computer-readable medium of claim 30, wherein the event collaboration component is further operative to cease generating the user interface after at least one of completion of the social event and an indication that the contact associated with the computing device is not interested in the social event.

34. The non-transitory computer-readable medium of claim 30, wherein the data obtained from the one or more external sources is requested by one or more contacts of the group.

35. The non-transitory computer-readable medium of claim 30, wherein the data obtained from the one or more external sources is automatically obtained from the one or more external sources.

36. The non-transitory computer-readable medium of claim 30, wherein the user interface includes at least one selectable control for initiating communication with one or more other contacts in the group during the social event.

37. The non-transitory computer-readable medium of claim 30, wherein the data obtained from the one or more external data sources includes a map upon which points of interest associated with the social event are indicated.

* * * * *

UNITED STATES PATENT AND TRADEMARK OFFICE
CERTIFICATE OF CORRECTION

| | | |
|---|---|---|
| PATENT NO. | : 8,631,070 B2 | Page 1 of 1 |
| APPLICATION NO. | : 12/413487 | |
| DATED | : January 14, 2014 | |
| INVENTOR(S) | : Vance et al. | |

It is certified that error appears in the above-identified patent and that said Letters Patent is hereby corrected as shown below:

In the Specification:

In column 7 at line 36, Change "B." to --B,--.

In column 14 at line 46, Change "B." to --B,--.

In column 14 at line 54, Change "B." to --B,--.

In column 14 at line 65, Change "a periodic" to --aperiodic--.

In column 16 at line 8, Change "B." to --B,--.

In column 16 at line 52, Change "B." to --B,--.

In column 17 at line 30, Change "userB." to --user B.--.

In the Claims:

In column 22 at lines 15-16, In Claim 26, change "the data obtained from the one or more external sources" to --the event data--.

Signed and Sealed this
Ninth Day of September, 2014

Michelle K. Lee
*Deputy Director of the United States Patent and Trademark Office*